(12) United States Patent  
Hansen

(10) Patent No.: US 8,872,634 B2  
(45) Date of Patent: Oct. 28, 2014

(54) INTEGRATED DETECTION POINT PASSIVE RFID TAG READER AND EVENT TIMING SYSTEM AND METHOD

(75) Inventor: Kurt S. Hansen, Chesterfield, MO (US)

(73) Assignee: Innovative Timing Systems, LLC, St. Louis, MO (US)

(*) Notice: Subject to any disclaimer, the term of this patent is extended or adjusted under 35 U.S.C. 154(b) by 433 days.

(21) Appl. No.: 13/226,408

(22) Filed: Sep. 6, 2011

(65) Prior Publication Data

US 2012/0223817 A1    Sep. 6, 2012

Related U.S. Application Data

(60) Provisional application No. 61/380,092, filed on Sep. 3, 2010.

(51) Int. Cl.
*H04Q 5/22* (2006.01)
*G06K 7/10* (2006.01)
*G07C 1/24* (2006.01)

(52) U.S. Cl.
CPC ............. *G07C 1/24* (2013.01); *G06K 7/10039* (2013.01)
USPC ... 340/10.33; 340/10.1; 340/10.3; 340/10.34; 340/10.42; 340/10.52

(58) Field of Classification Search
USPC .............. 340/10.1, 10.3, 10.33, 10.34, 10.42, 340/10.52, 12.5, 12.51, 13.25, 13.26, 572.1, 340/573.1
See application file for complete search history.

(56) References Cited

U.S. PATENT DOCUMENTS

| | | |
|---|---|---|
| 4,142,680 A | 3/1979 | Oswald et al. |
| 5,091,895 A | 2/1992 | Chatwin et al. |
| 5,140,307 A | 8/1992 | Rebetez et al. |
| 5,436,611 A | 7/1995 | Arlinghaus, Jr. |
| 5,493,805 A | 2/1996 | Penuela et al. |
| 5,511,045 A | 4/1996 | Sasaki et al. |
| 5,604,485 A | 2/1997 | Lauro et al. |
| 5,696,481 A | 12/1997 | Pejas et al. |
| 5,812,049 A | 9/1998 | Uzi |
| 5,821,902 A | 10/1998 | Keen |
| 5,883,582 A | 3/1999 | Bowers et al. |
| 5,973,598 A | 10/1999 | Beigel |
| 6,008,773 A | 12/1999 | Matsuoka et al. |
| 6,100,804 A | 8/2000 | Brady et al. |
| 6,204,813 B1 | 3/2001 | Wadell et al. |
| 6,278,413 B1 | 8/2001 | Hugh et al. |

(Continued)

FOREIGN PATENT DOCUMENTS

| | | |
|---|---|---|
| EP | 2009595 A | 12/2008 |
| JP | 2008-276353 A | 11/2006 |

(Continued)

OTHER PUBLICATIONS

PCT Search Report, PCT US 2010-022559, Jan. 29, 2010.

(Continued)

*Primary Examiner* — Steven Lim
*Assistant Examiner* — Sisay Yacob
(74) *Attorney, Agent, or Firm* — Polster Lieder

(57) ABSTRACT

A tag reader system, method and timing system for determining a time of detection of a passive RFID tag relative to a detection line located along a route traveled by the RFID tag.

43 Claims, 12 Drawing Sheets

(56) References Cited

U.S. PATENT DOCUMENTS

| | | |
|---|---|---|
| 6,340,932 B1 | 1/2002 | Rodgers et al. |
| 6,369,697 B1 | 4/2002 | Poole |
| 6,466,178 B1 | 10/2002 | Muterspaugh |
| 6,496,806 B1 | 12/2002 | Horwitz et al. |
| 6,512,478 B1 | 1/2003 | Chien |
| 6,570,487 B1 | 5/2003 | Steeves |
| 6,577,238 B1 | 6/2003 | Whitesmith et al. |
| 6,696,954 B2 | 2/2004 | Chung |
| 6,703,935 B1 | 3/2004 | Chung et al. |
| 6,710,713 B1 | 3/2004 | Russo |
| 6,720,930 B2 | 4/2004 | Johnson et al. |
| 6,812,824 B1 | 11/2004 | Goldinger et al. |
| 6,839,027 B2 | 1/2005 | Krumm et al. |
| 6,888,459 B2 | 5/2005 | Stilp |
| 6,888,502 B2 | 5/2005 | Beigel et al. |
| 6,952,157 B1 | 10/2005 | Stewart et al. |
| 6,963,270 B1 | 11/2005 | Gallagher, III et al. |
| 6,989,750 B2 | 1/2006 | Shanks et al. |
| 6,995,655 B2 | 2/2006 | Ertin et al. |
| 7,009,562 B2 | 3/2006 | Jenabi |
| 7,019,639 B2 | 3/2006 | Stilp |
| 7,057,511 B2 | 6/2006 | Shanks et al. |
| 7,057,975 B2 | 6/2006 | Stobbe |
| 7,508,739 B2 | 3/2009 | Paes |
| 7,589,616 B2 | 9/2009 | Klatsmanyi et al. |
| 7,605,685 B2 | 10/2009 | Stewart et al. |
| 7,605,689 B2 | 10/2009 | Hein et al. |
| 7,667,602 B2 * | 2/2010 | Ulrich .................. 340/572.1 |
| 7,675,822 B2 * | 3/2010 | Moritani ..................... 368/3 |
| 8,085,136 B2 | 12/2011 | Stewart et al. |
| 8,179,233 B2 | 5/2012 | Kia |
| 2002/0008624 A1 | 1/2002 | Paek |
| 2002/0044057 A1 | 4/2002 | Zirbes |
| 2002/0044096 A1 | 4/2002 | Chung |
| 2003/0073518 A1 | 4/2003 | Marty et al. |
| 2003/0163287 A1 | 8/2003 | Vock et al. |
| 2003/0189484 A1 | 10/2003 | Rust et al. |
| 2004/0006445 A1 | 1/2004 | Paek |
| 2005/0099269 A1 | 5/2005 | Diorio et al. |
| 2006/0097847 A1 | 5/2006 | Bervoets et al. |
| 2006/0097874 A1 | 5/2006 | Salesky et al. |
| 2006/0103536 A1 | 5/2006 | Kwak et al. |
| 2006/0176216 A1 | 8/2006 | Hipskind |
| 2007/0076528 A1 | 4/2007 | Kirby |
| 2007/0182567 A1 | 8/2007 | Stewart et al. |
| 2007/0252770 A1 | 11/2007 | Kai et al. |
| 2007/0262871 A1 | 11/2007 | Yamagajo et al. |
| 2007/0272011 A1 | 11/2007 | Chapa et al. |
| 2008/0018479 A1 | 1/2008 | Hashimoto et al. |
| 2008/0021676 A1 | 1/2008 | Vock et al. |
| 2008/0074954 A1 * | 3/2008 | Moritani ..................... 368/113 |
| 2008/0111695 A1 | 5/2008 | Yamagajo et al. |
| 2008/0143620 A1 | 6/2008 | Khatri |
| 2008/0174432 A1 * | 7/2008 | Ulrich .................. 340/572.1 |
| 2008/0246615 A1 | 10/2008 | Duron et al. |
| 2008/0246616 A1 | 10/2008 | Sakama et al. |
| 2008/0284654 A1 | 11/2008 | Burnside et al. |
| 2008/0316032 A1 | 12/2008 | Kia |
| 2009/0015377 A1 | 1/2009 | Fogg et al. |
| 2009/0184806 A1 | 7/2009 | Kia |
| 2009/0231198 A1 | 9/2009 | Walsh et al. |
| 2010/0019897 A1 | 1/2010 | Stewart et al. |
| 2010/0051701 A1 | 3/2010 | Ogata et al. |
| 2010/0088023 A1 | 4/2010 | Werner |
| 2010/0295943 A1 | 11/2010 | Cha et al. |
| 2010/0302910 A1 | 12/2010 | Howell |
| 2012/0115557 A1 | 5/2012 | Kia |

FOREIGN PATENT DOCUMENTS

| | | |
|---|---|---|
| JP | 4394600 A | 10/2009 |
| JP | 2010-088886 A | 4/2010 |
| KR | 10-2006-0078335 A | 7/2006 |
| KR | 10-2007-0092982 A | 9/2007 |
| KR | 10-2008-0090269 A | 10/2008 |
| KR | 10-2010-0100500 A | 9/2010 |

OTHER PUBLICATIONS

PCT Search Report, PCT US 2011-026717, Mar. 1, 2011.
Electronic Product Code (EPC) Tag Data Standards Version 1.1 Rev. 1.24; EPC Global, Inc. Apr. 1, 2004.
Integration of RFID and Cellular Technologies, UCLA, WINMEC 2004; Karali, Sep. 2004.
Alien Debuts Gen 2 Interrogator, RFID Journal; O'Connor, Aug. 4, 2005.
Antenna Design for UHF RFID Tags: A Review and a Practical Application, IEEE Transactions on Antennas and Propagation, vol. 53, No. 12; Rao and Nikitin, Dec. 2005.
Electronic Product Code (EPC) Radio-Frequency Indentity Protocols Class-1 Generation-2 UHF FRID Protocol for Communications at 860 MHz-960 Mhz, Version 1.0.9; EPC Global, Inc., Jan. 2005.
Electronic Product Code (EPC) Generation 1 Tag Data Standards Version 1.1 Rev.1.27; EPC Global, Inc., May 10, 2005.
UHF Gen 2 System Overview, TI-RFID; Texas Instruments, Mar. 2005.
Trolleyponder/Ecotag RFID Newsletter, No. 51; Trolley Scan Pty Ltd, Jan. 5, 2006.
Tests on Timing Module for Sports Timing; Trolley Scan Pty, Jun. 2004.
New for 2005—BEST Racing now uses DAG chip timing; DAG 2005.
Intermec RFID System Manual; Intermec 2005.
RFID Primer; Alien Technology, 2004.
DAG System Instructions, Version 4; Pygma Lyon (DAG), Jul. 9, 2004.
DAG System Instructions—DAG Triathlon, Version 5; Pygma Lyon (DAG) Jul. 23, 2004.
DAG System—Badgeur V2 Sport Version Datasheet; Pygma Lyon (DAG), Jul. 19, 2004.
Annex 1: Utilization of the Dag Badger System; Pygma Lyon (DAG).
Alien RFID Academy Training Manual; Alien Technology, Sep. 22, 2004.
Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2011-020901, Jan. 11, 2011.
PCT Search Report, PCT US 2011-020905, Jan. 11, 2011.
PCT Search Report, PCT US 2011-046032, Jul. 20, 2011.
PCT Search Report, PCT US 2011-050570, Sep. 6, 2011.

* cited by examiner

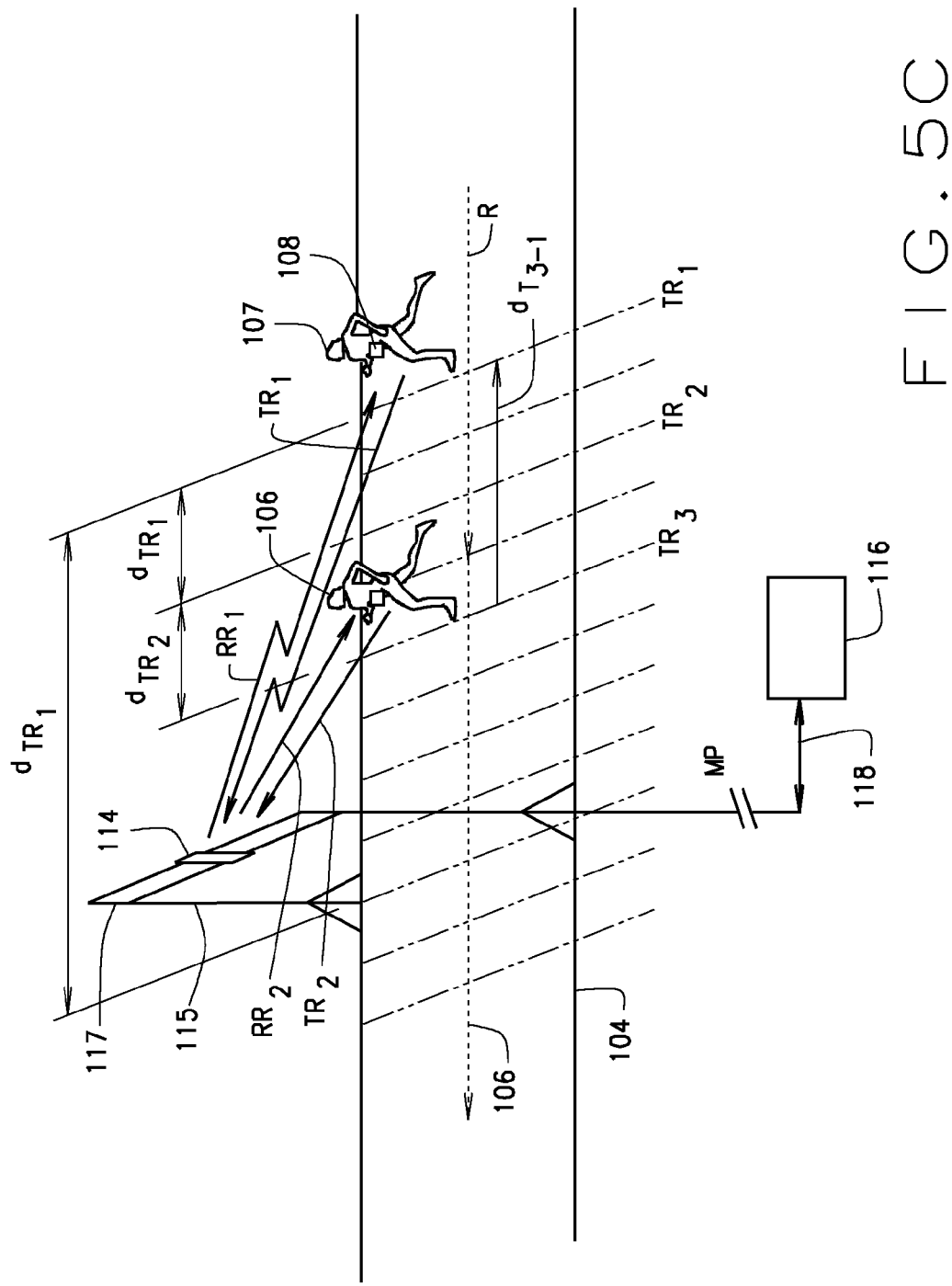

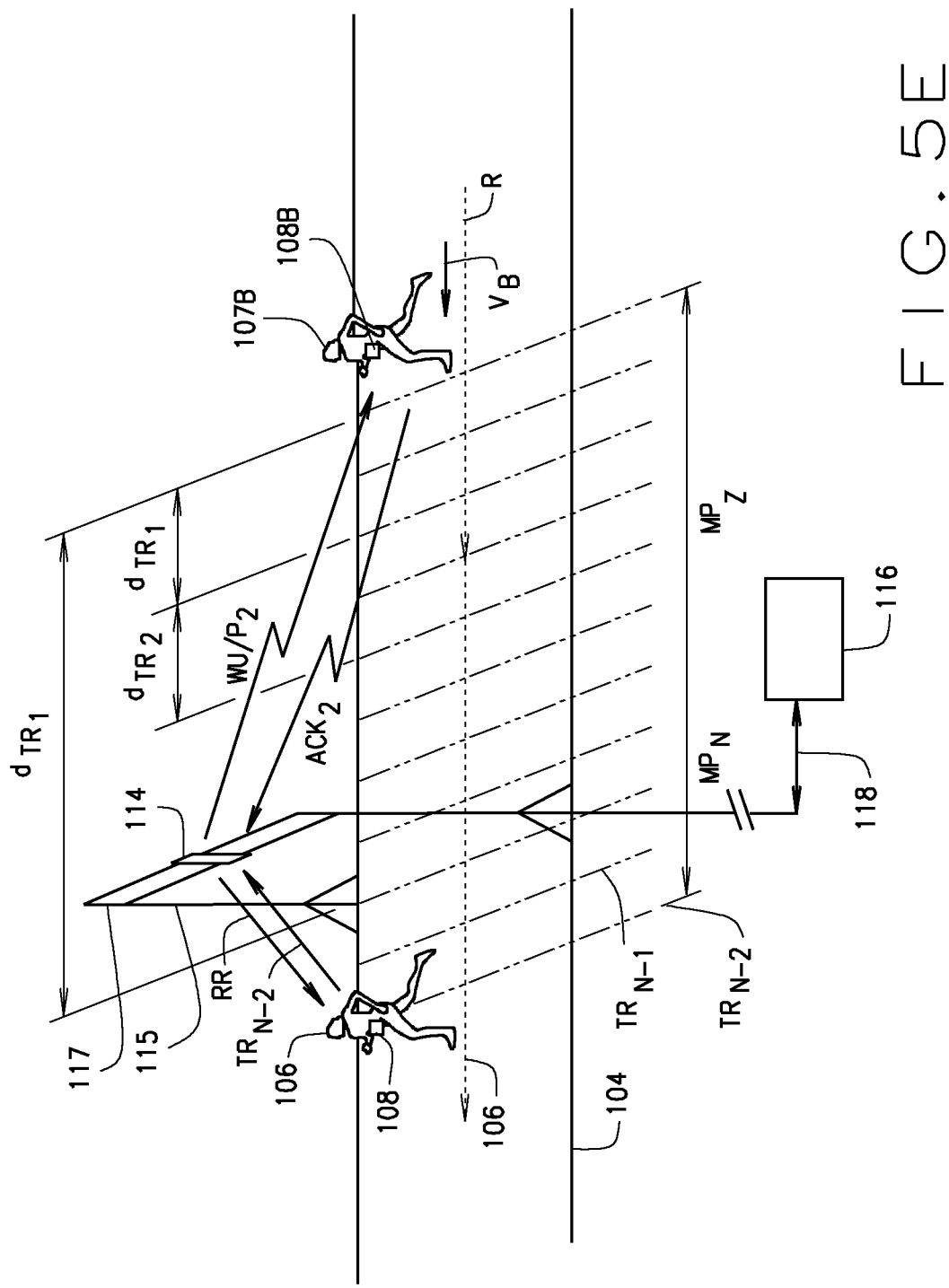

INTEGRATED DETECTION POINT PASSIVE RFID TAG READER AND EVENT TIMING SYSTEM AND METHOD

CROSS-REFERENCE TO RELATED APPLICATIONS

This application claims the benefit of U.S. Provisional Application No. 61/380,092, filed on Sep. 3, 2010 entitled INTEGRATED DETECTION POINT PASSIVE RFID TAG READER AND EVENT TIMING SYSTEM AND METHOD.

The disclosure of the above applications is incorporated herein by reference.

FIELD

The present disclosure relates to timing systems, and more specifically, timing systems for RFID detection and timing of participants in timed sporting events.

BACKGROUND

The statements in this section merely provide background information related to the present disclosure and may not constitute prior art.

When timing a sporting event, it is often desired to use passive RFID tags for identifying the proximity of a sporting event participant to a monitored milestone such as a starting line or finish line, for example. The RFID tags are placed on a participant or the participant's vehicle for uniquely identifying the participant and for identifying the passing of the participant at the monitored point. Sporting events often have numerous participants, often more than 1,000, and often more than a few of those participants can be expected to pass by a monitored point nearly simultaneously or within a very short period of time. For example, at a start of a marathon race, nearly all of the participants can pass the starting line within a very short period of time.

However, RFID readers typically do not have the ability to read a large number of RFID tags at sufficient distances so as to not interfere with the participants and that provide for the desired accuracy of tag reads such that nearly all if not all participant tags are read and there are no missed tags.

Additionally, many of the RFID tag reader systems are not suitable for timing races having numerous participants such as marathon races as well as other types of races in a cost effective manner for many such events. For example, many RFID tag reader systems are components that have to be installed on site and wired together for operation at an event.

SUMMARY

The inventor hereof has succeeded at designing an event timing system and method providing a highly accurate detection and time stamping of a passing of a plurality of passive RFID tags in a cost effective manner by having an RFID tag reader system that is self-contained in a housing that can be mounted easily and quickly. The components of the RFID tag reader are contained in a cavity of the housing. This includes an RFID tag reader antenna. The cavity and housing can be configured in some embodiments so that the RFID tag reader antenna can increase the antenna gain to provide enhanced tag read range and accuracy for the TRS system as described herein.

In one aspect, a tag reader system for determining a time of detection of a passive RFID tag relative to a detection line located along a route traveled by the RFID tag. The tag reader system including a processor, a memory coupled to the processor for storing computer executable instructions, operating parameters, tag reads and created RFID tag read messages, and a clock coupled to the processor and including an interface for receiving an input signal for setting a current time of the clock. A communication interface is coupled to the processor for communicating with a remote timing system including the transmitting of created RFID tag read messages as stored in the memory and receiving RFID tag read message requests from the timing system and remote tag reader instructions. A wireless transceiver is coupled to the processor for wirelessly communicating with the RFID tag. An antenna is coupled to the radio frequency transceiver for transmitting and receiving wireless messages between the transceiver and the RFID tag. The combination of the antenna and the housing can provide an effective gain of about 6 dBi. The antenna transmits a plurality of tag read messages as received from the transceiver and receives tag reads from a plurality of RFID tags located in proximity to the detection line to which the housing is positioned. A housing has a cavity for enclosing the processor, the memory, the clock, the transceiver, and the antenna, the housing including a mounting fixture for mounting the tag reader system in a fixed position in proximity to the detection line for reading RFID tags located in a range of between about 1 and about 20 feet.

In another aspect, a tag reader system is provided for determining a time of detection of a passive RFID tag relative to a detection line located along a route traveled by the RFID tag. The tag reader system has a housing with a cavity containing a processor, a memory, a clock, a communication interface, a radio frequency transceiver for wirelessly communicating with a plurality of the RFID tags, computer executable instructions and an antenna coupled to the radio frequency transceiver for transmitting and receiving wireless messages between the transceiver and each communicating RFID tags. The housing includes a fixture for mounting the housing in proximity to the detection line. The tag reader system is configured by the computer executable instructions for transmitting a plurality of tag read requests and receiving a plurality of tag reads from each communicating RFID tag when each is located in proximity to the detection line. It is also configured for time stamping at least two of each of the RFID tag reads for each RFID tag including a first tag read and a subsequent tag read and creating a RFID tag read message for each RFID tag read wherein each RFID tag read message includes the first and subsequent tag reads for a single one of the RFID tags with their associated time stamps, and transmitting over the communication interface each RFID tag read message. A timing system has a memory and processor and a communication interface communicatively coupled to the communication interface of the tag reader system for receiving the transmitted RFID tag read messages, the timing system determining a lapsed time for each RFID tag traversing the route traveled responsive to the received RFID tag read message and at least one of the included tag reads and associated time stamps.

According to another aspect, a method is provided for determining a time of detection of a passive RFID tag relative to a detection line located along a route traveled by the RFID tag. The method is implemented by a tag reader system having a housing with a cavity, a processor, a memory, a plurality of computer implementable instructions stored in the memory and executable by the processor, a clock, a communication interface, a radio frequency transceiver coupled to the processor for wirelessly communicating with the RFID tag, and an antenna coupled to the radio frequency transceiver, the processor, the memory, the clock, the transceiver, and the antenna being positioned within the cavity of the housing, the housing including a fixture for positioning the tag reader system in a fixed position in proximity to the detection line. The method implemented by such tag reader system includes receiving instructions over the communication interface from a remote timing system including at least one parameter for operation of at least one of the transceiver, antenna, and the computer implementable instructions. The system then updates an operating parameter of the tag reader system responsive to the received instructions including the at least one parameter. The method includes transmitting via the transceiver and the antenna a wake up/powering message, said transmitting being on a periodic basis defined by an operating transmission interval parameter as received from the processor and receiving a plurality of acknowledgement messages from a plurality of communicating RFID tags that are in the proximity of the tag reader system, each acknowledgement message including an RFID tag identifier for uniquely identifying a particular one of the proximal RFID tags from among the plurality of communicating proximal RFID tags. The method also includes transmitting a first read request to a first particular one of the communicating RFID tags utilizing the RFID tag identifier for that tag as received in the acknowledgement message for that particular one RFID tag and receiving a first tag read from the particular one communicating RFID tag following the transmitting of the first read request. The method provides for time stamping the first tag read based on a first time of receipt of the first tag read as determined by the clock and storing the time stamped first tag read in the memory for the particular one RFID tag. The method also includes transmitting a second read request to the particular one communicating RFID tag utilizing the same unique tag identifier for that tag, and receiving a second tag read from the particular one communicating RFID tag following the transmitting of the second read request. The method then provides for time stamping the second tag read based on a second time of receipt of the second tag read as determined by the clock and storing the time stamped second tag read in the memory for the particular one RFID tag. The system then implements the method of determining an average time value for the first and second tag reads for the particular one communicating RFID tag and storing the average time in the memory for the particular one RFID tag and determining a number of tag read instances of first and second tag reads associated with the particular one communicating RFID tag and storing the number of tag read instances in the memory for the particular one RFID tag. The method also provides for creating a RFID tag read message including the RFID tag identifier and the time stamped first tag read and the average time value. The method provides for receiving a request from the remote timing system over the communication interface for communicating RFID tag read messages from RFID tag reads as received by the tag reader system; and transmitting the created RFID tag read message over the communication interface.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIGS. 5A to 5E are various snap shot illustrations showing detection and timing of a passive RFID tag moving along a route and relative to a detection line monitored by an integrated tag reader system (TRS) according to one exemplary embodiment.

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

Figure 1:
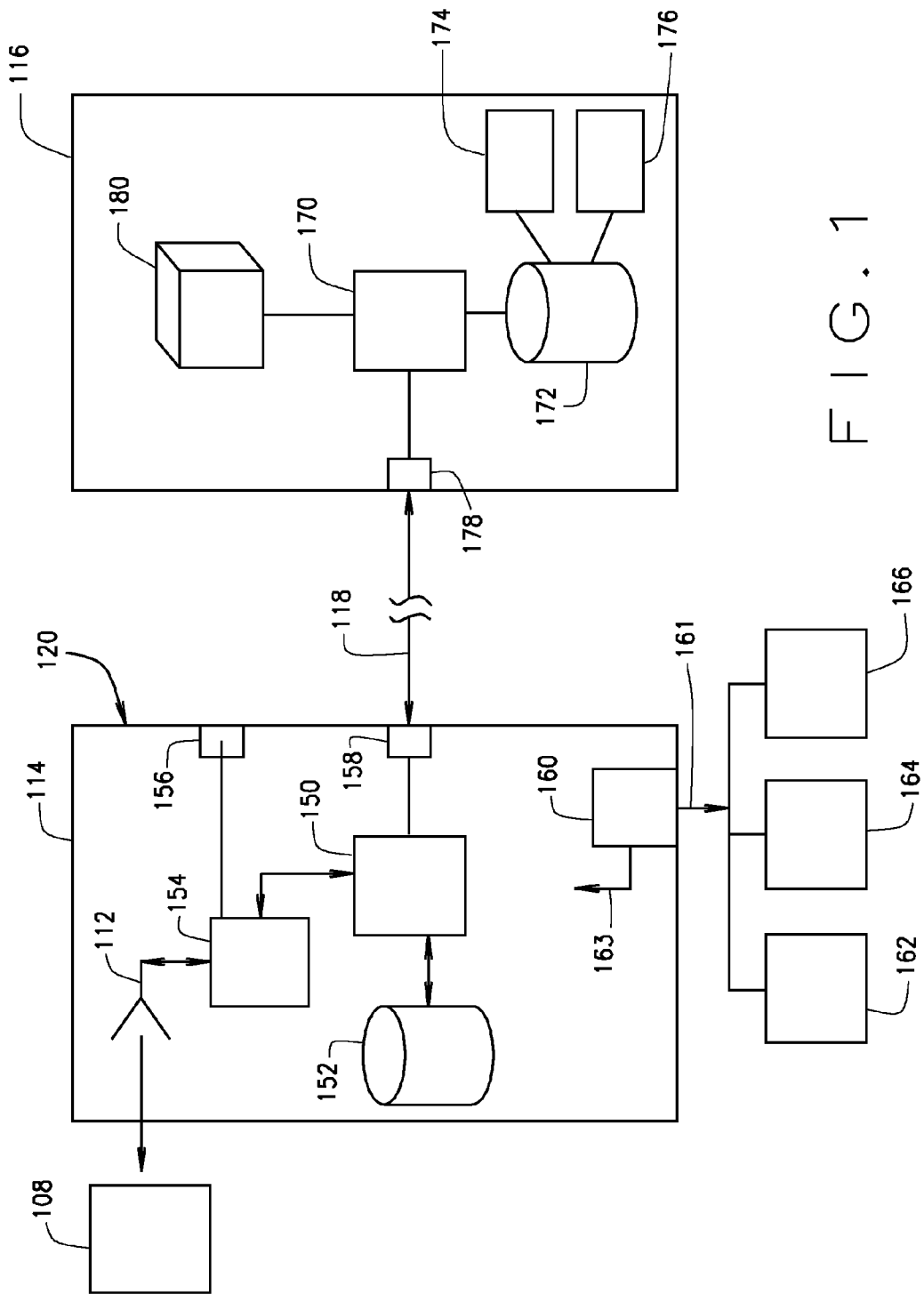
FIG. 1 is block diagram of a system for timing using an RFID tag reader system (TRS) according to one exemplary embodiment.

In one embodiment, as shown by example in FIG. 1, a timing system as described by the various embodiments herein are provided for determining a time of detection of a plurality of passive RFID tags 108 relative to a detection line or monitored point (MP) located along a route traveled by the RFID tags. Typically, this includes a tag reader system (TRS) 114 having an integrated antenna 112 and a remote timing system 116. The tag reader system 114 has a housing 120 with a cavity 113 (shown in FIG. 4) containing a processor 150, a memory 152, a clock (not shown), a communication interface 158, a radio frequency transceiver 154 for wirelessly communicating with a plurality of the RFID tags 108. The antenna 112 is coupled to the radio frequency transceiver 154 for transmitting and receiving wireless messages between the transceiver 154 and each communicating RFID tag 108. The housing 120 includes a fixture 132 for mounting the housing 120 in proximity to the detection point MP. The tag reader system 114 transmits a plurality of tag read requests (RR) and receives a plurality of tag reads (TR) from each communicating RFID tag 108 when the RFID tag 108 is located in proximity to the detection point MP. The tag reader system 114 time stamps at least two of each of the RFID tag reads TR including a first tag read $TR_1$ and a subsequent tag read $TR_N$ (for each RFID tag). The TRS 114 creates a RFID tag read message TRM for each wherein each RFID tag read message TRM includes for each RFID tag the first and subsequent tag reads and their associated time stamps. The TRS 114 stores the RFID tag read messages TRS in its memory. The TRS 114 transmits each RFID tag read message TRM over its communication interface 158 to a timing system 116. The TRS 114 can also include an external antenna interface 156 coupled to the transceiver for interfacing with an external antenna (not shown). The external antenna interface 156 can be communicatively coupled to the radio frequency transceiver 154 for wirelessly communicating with the RFID tag 108 via the external antenna separately and independently from the antenna 112 positioned within the housing. Further, the TRS 114 can include a power interface 160 for providing TRS system power 163 to the various components of the TRS 114. The power interface 160 can interface receives external power 161 from a battery 162, a fuel cell 164, a solar power cell 166 or any other form of energy. Such power supplies can be external to the housing 120 or can be provided within the housing 120.

The timing system 116 can also include a processor 170 coupled to a memory 172. The memory can include a TRS instruction module 174 and a timing system module 176 that are computer executable instructions or code for controlling the operation of the TRS 114 and the TS 116. The TS 116 also includes a communication interface 178. The TS communication interface 178 is coupled to a communication facility 118 that is communicatively coupled to the TRS communication interface 158. Each of which can be any type of suitable data interface and is not intended to be limiting. The operation and functionality of these communication interfaces will be described in greater detail below.

Figure 2:
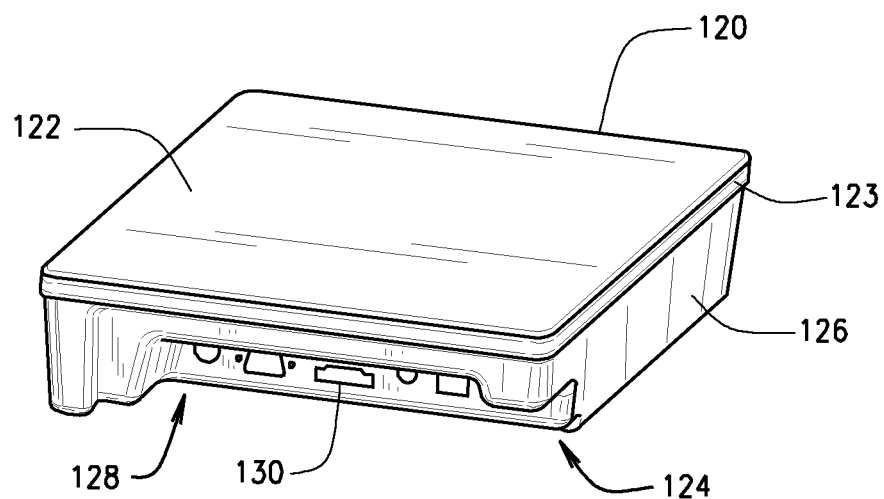
FIG. 2 is a top perspective view of a tag reader system according to one exemplary embodiment.
Figure 3:
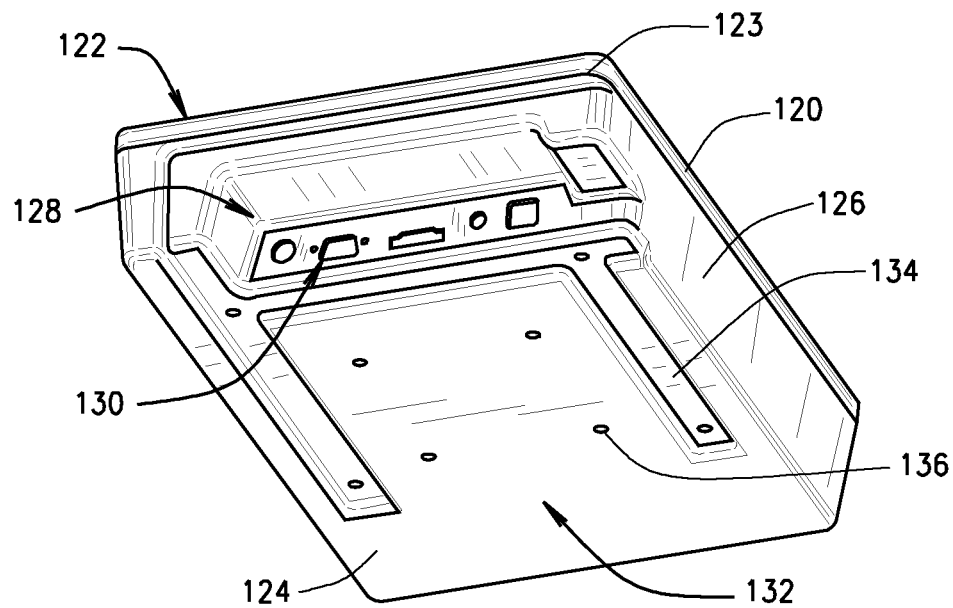
FIG. 3 is a bottom perspective view of the tag reader system of FIG. 2 according to one embodiment.
Figure 4:
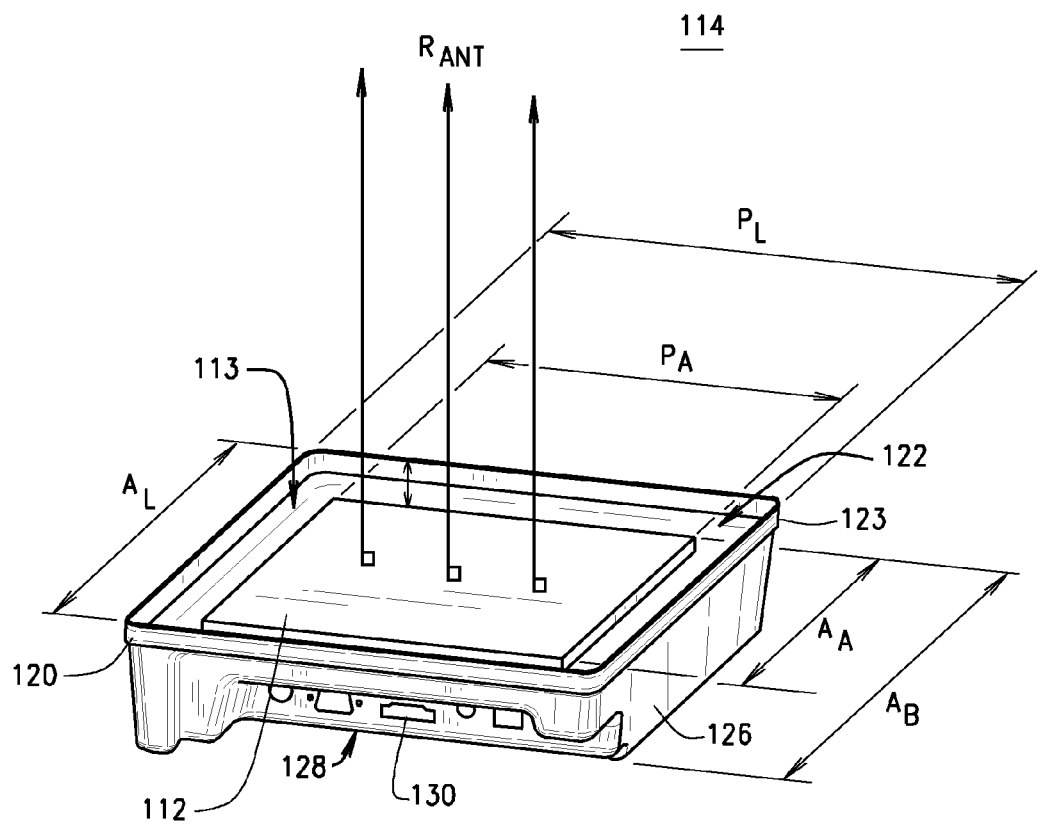
FIG. 4 is a top perspective view of a tag reader system with the lid wall removed and illustrating exemplary components within a cavity of a housing including a planar antenna according to one exemplary embodiment.

The housing 120 has the cavity 113 that enclosing the processor 150, the memory 152, the clock, the transceiver 154, and the antenna 112. In some embodiments, as shown in FIGS. 2-4, the housing has a bottom wall 124, four side walls 126 and a lid wall 122. In one exemplary embodiment as to dimensions, the bottom wall 124 has dimensions of about 10 inches by about 14.7 inches for an area of $A_B$ and the lid wall has dimensions of about 10.9 inches by about 15.6 inches for an area of $A_L$. As such, in some embodiments the bottom wall 124 and lid wall 122 are in parallel planes with the lid wall 122 having a greater area $A_L$ than the area $A_B$ of the bottom wall 124. Therefore, in such embodiments, each of the four side walls 126 is sloped outwardly from a coupling with the bottom wall 124 to a coupling with the lid wall 122. The lid wall 122 can be coupled to the side walls 126 via a semi-permanent or removable sealing fixture 123 as shown in FIG. 2-4. The housing can include an indentation or indented area 128 on one or more sides 126 that can include various interfaces or couplings 129, for example the physical plug for the communication interface 118, the physical plug for the external antenna interface 156 and/or the physical coupling for the power interface 160.

As shown in FIG. 4, the antenna 112 can be positioned in the cavity 113 at an offset distance between the bottom wall 124 and the lid wall 122, the distance therebetween can be about 3 inches in one embodiment. In some embodiments, the housing 120 is configured from ABS plastic material having an integrated UV protective material, however, other materials are also possible and suitable. In some embodiments, the housing 120 has a bottom wall 124, four side walls 126 and a lid wall 122 that each have a thickness of about 0.125 inch.

In some embodiments, the mounting fixture 132 can be integrated within an exterior surface of the bottom wall 124 of the housing. The mounting fixture 132 can include mounting pads or rails 134 and/or one or more mounting holes 136 for receiving a fastener such as a screw or a bolt, by way of example.

In some embodiments, the combination of the antenna and the housing has an effective gain of about 6 dBi. In one embodiment, the TRS system 114 has the transceiver 154 and the antenna 112 configured to transmit and receive in about 900 MHz to about 930 MHz frequency band. However, other frequencies are also possible. In some embodiments, as shown in FIG. 4, the antenna 112 can lie in a plane $P_A$ that is positioned within the cavity 113 of the housing 120 in an offset parallel plane $P_L$ that includes a lid wall 122 of the housing 120 and wherein the offset is about 0.75 inches. While the antenna 112 can be any type of suitable antenna, in one embodiment the antenna 120 is a substantially directional antenna having greater gain in the direction $R_{ANT}$ that is substantially perpendicular with the plane $P_L$ of the lid wall 122 and outwardly from the lid wall 122 as shown in FIG. 4.

The antenna 112 transmits a plurality of tag read requests RR as received from the transceiver 154 and receives tag reads TR from a plurality of RFID tags 108 located in proximity to the monitored point MP to which the TRS is positioned for monitoring. As noted, the housing 120 includes the mounting fixture 132 for mounting the tag reader system 114 in a fixed position in proximity to the monitored point $MP_N$ or monitored zone $MP_Z$ for reading RFID tags 108 located in a range of between about 1 and about 20 feet. In operation, in one embodiment, the housing 120 is configured to be mounted about 7 feet above a plane of the surface of the ground upon which defines the route traveled by the RFID tag 108. To mount such a TRS 114, a gantry 115 can be provided at the monitored point MP that includes a horizontal portion 117 on which the TRS 114 can be mounted as shown in FIGS. 5A-5E.

In one embodiment, the tag reader system 114 determines a time for each of the received tag read and determines an average time based on the determined time for all of the received plurality of tag reads for each RFID tag 108 and creates average time tag read that is included in the RFID tag read message TRM, wherein the RFID tag read message TRM consists of the first and a last occurring subsequent tag read and the determined average time tag read.

Figure 5A:
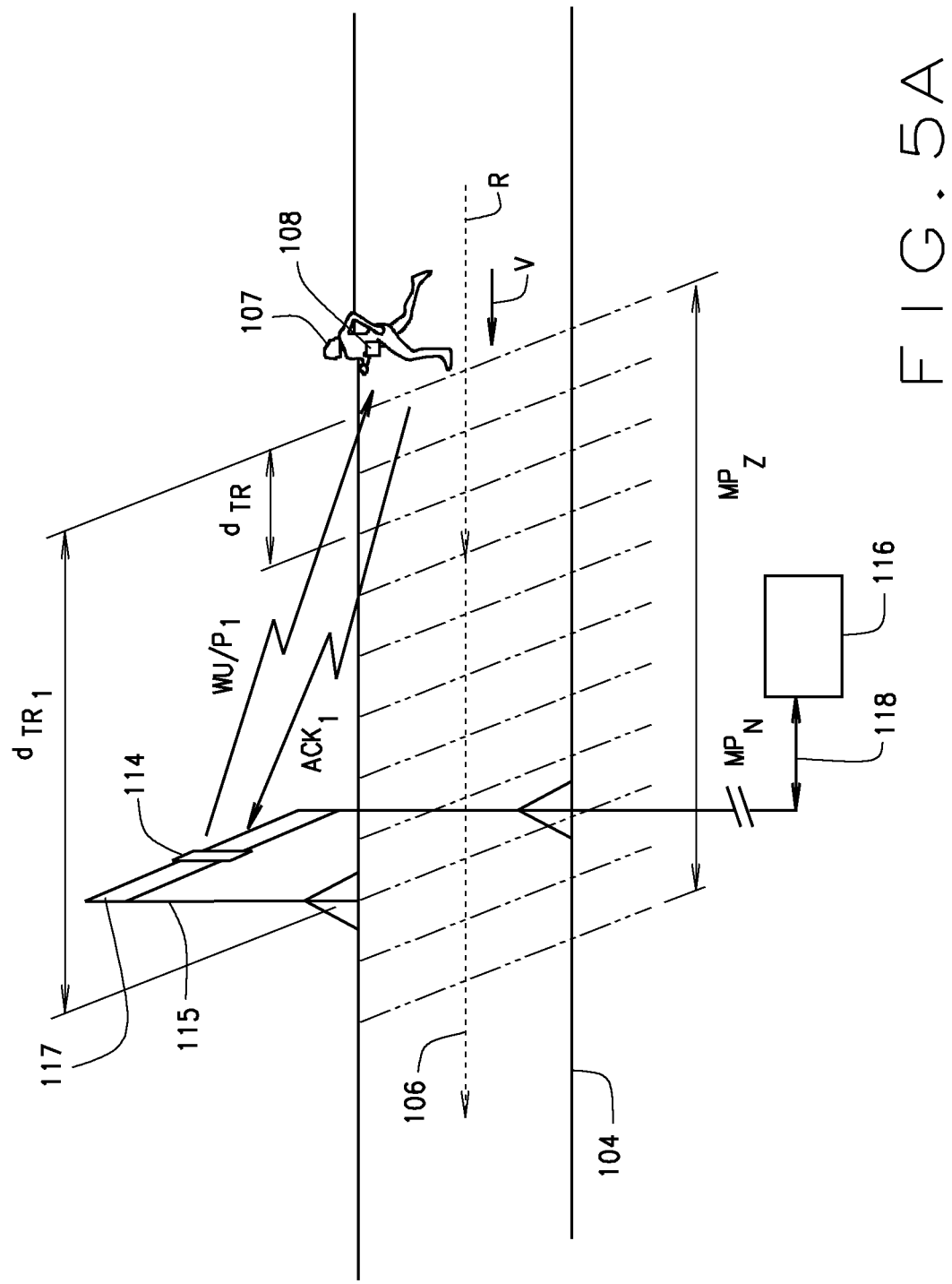
Figure 5B:
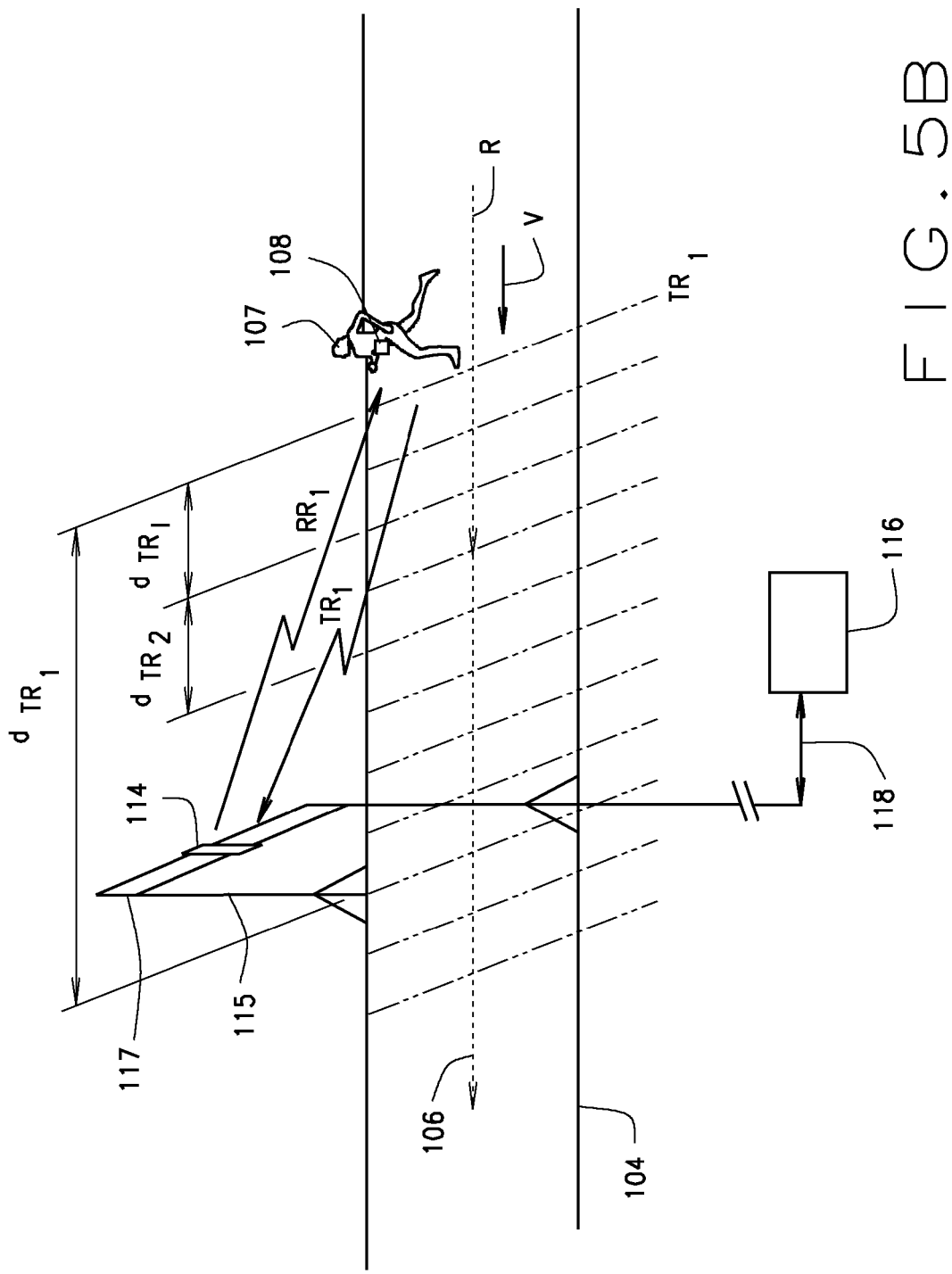

Referring now to FIGS. 5A to 5E, each of which shows the reading of a passing tag by a monitored point MP. Each of these figures, shows at least a single participant 107 with a corresponding RFID tag 108 traversing a race track or course 104 along a route 106 (also denoted as R). The participant 107 and therefore the RFID tag 108 is traveling along the route 106 at a velocity of V. The TRS 114 mounted on the gantry 115 overhead on the horizontal portion 117 defines a monitored zone $MP_Z$ that includes a distance $d_{TR1}$ in front of the $MP_N$ and includes a portion of the region beyond the $MP_N$. Generally, the RFID tag 108 is a passive RFID tag but in some embodiments could be an active RFID tag. As shown in FIG. 5A, when a passive RFID embodiment, the wireless transceiver 154 transmits a wakeup/powering activation message $WU/P_1$ to the RFID tag 108 and the RFID tag responds with an acknowledgement $ACK_1$ that includes a unique identification of the tag 108. Subsequently, the TRS system 114 transmits an addressed read request $RR_1$ message as shown in FIG. 5B to that unique RFID tag 108 and the RFID tag responds with a tag read $TR_I$. The TRS system 114 tracks each communicating tag 108 and can time stamp each or only a portion of the tag reads TR received from each RFID tag 108.

The tag read requests RR generated by the TRS 114 are continuously transmitted as pulsed messages. The pulse rate can be a set rate or can be an adjustable or predetermined rate based on a system or user defined operating parameter. Each of the tag reads TR includes a unique identification or serial number of the previously acknowledging RFID tag 108. The TRS system 114 time stamps the time of receipt of each tag read TR based on the current time of the clock of the TRS.

Figure 5D:
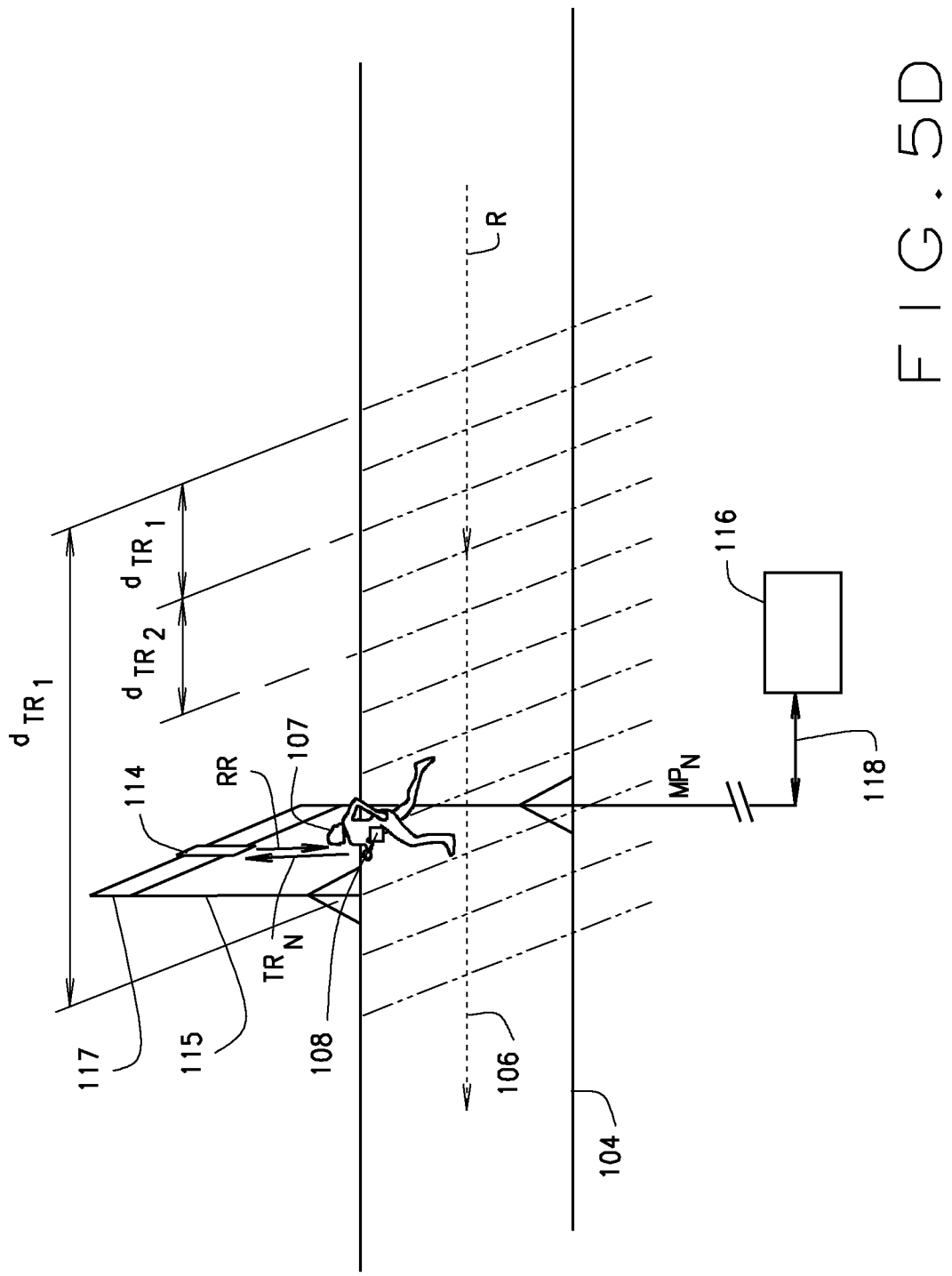

As shown in FIG. 5C, the participant 107 and the tag 108 have continued to travel the route R or 106. As shown, additional subsequent read requests $RR_2$ have been made by the TRS 114 and subsequent tag reads $TR_2$ have been sent back and received by the antenna 112 of the TRS 114. In some embodiments, the tag 108 may have enough stored energy for generating more than one tag read TR without having to be prompted by an additional read request RR. As shown, more than one tag read TR can be made at defined intervals or spacings as shown by the incremental read distances $D_{TR1}$ and $D_{TR2}$ in FIG. 5C. As noted the distance between each tag read TR can be shown as $D_{TR3-1}$ based on an estimated velocity V of the participant 107. This process continues for each participant 107 even as the participant passes under the tag reader 114 as shown in FIG. 5D and passing on the other side of the tag reader 114 or the gantry 115 as shown in FIG. 5E. Of course, as shown on FIG. 5E, the process continues with a second participant 107B having a separate RFID tag 108B and that is traveling at a separate velocity $V_B$ along route R 106.

As noted, the system can store in the tag read message two or more tag reads (or in some cases could be only a single or the first tag read). After the first tag read TR, each subsequent tag read can also be time stamped and stored. In some embodiments, not all tag reads TR and their time stamp are stored. For example, in one embodiment the first tag read and time are stored. Afterwards each subsequent tag read TR is initially stored. However as each subsequent tag read TR is time stamped and stored, the TRS 114 can replace the prior subsequent tag read TR with the most recent subsequent tag read TR. This can be further modified by only keeping a defined portion of the tag reads TR. Additionally, some tag reads TR can be ignored. For example, in some embodiments, a subsequent tag read TR can be ignored and not stored or included in the RFID tag read message TRM when the time stamp of the subsequent tag read TR is determined to be greater than a predetermined time period following the immediately prior subsequent tag read TR. For example, the predetermined time period for ignoring certain tag reads can be established based on experience when timing a race to prevent tags 108 from falsely coming back within the proximity of the TRS system 1114. This predetermined time period can be user selectable to be any amount of time and may be adapted based on whether the TRS system 114 is being used at the beginning or start of a race or at a finish line or an intermediate position or check point along the route 106. As described, the tag reader system 114 can disregard at least one of the subsequent tag reads TR for each RFID tag 108 when such subsequent tag read TR has a time stamp of greater than a predetermined time period following the immediately prior subsequent tag read.

Generally, in some embodiments the tag reader system 114 receives a plurality of subsequent tag reads TR for each communicating RFID tag 108 and time stamps and stores each tag read in the tag reader memory 152. The TRS 114 can create the RFID tag read message TRM to include one or more tag read TR and its associated time stamp.

In other embodiments, the tag reader system 114 receives a plurality of subsequent tag reads TR for each communicating RFID tag 108 and time stamps and wherein the first tag read $TR_1$ and the last occurring subsequent tag read $TR_N$, but not the other subsequent tag reads TR, when creating the RFID tag read message TRM as transmitted to the timing system 116.

In other embodiments, the tag reader system 114 receives a plurality of subsequent tag reads TR for each communicating RFID tag 108. The TRS system 114 has a tag read counter for incrementing a tag read count parameter each received tag read TR for each communicating RFID tag 108, and wherein the RFID tag read message TRM is created to include the tag read count parameter.

In some embodiments, the tag reader system 114 transmits a sleep instruction including a sleep time to at least one of the communicating RFID tags 108 responsive to receiving a tag read responsive to a read request.

In other embodiments, each RFID tag read TR for each communicating RFID tag 108 is stored in the tag reader system memory 152 when received. As such, the TRS system 114 can be configured to only created, store and/or transmit the RFID tag read messages TRM responsive to a prompt received from the timing system 116. In some embodiments of using an external antenna, the tag reader system 114 creates the RFID tag read message TRM to include an identification of at least one of the antenna 112 and the external antenna interface 156 from which one of the included tag reads TR was received.

The tag reader system 114 transmits the time stamped tag read messages TRM to the timing system 116 at a user selectable interval or can be responsive to a timing system query. In one embodiment, the tag reader system 114 is configurable by a user or by the timing system 116 as a system defined instruction including a scan rate parameter for transmitting the tag read messages at every about 1 to about 9 seconds.

As noted, the TRS system 114 can be configured to receive instruction or system or user defined operating parameter over its communication interface 158. For instance, the timing system 116 can be configured with instructions for the tag reader system 114 including power level settings of the transceiver 154 and settings for the antenna 112. In one exemplary embodiment, the tag reader system 114 is programmed by the timing system 116 through these instructions for reading a rate of predetermined number of RFID tag reads TR per tag 108, with each RFID tag 108 being read more than once during an expected proximity period of the RFID in proximity to the tag reader system 114, by way of example.

In this regard, in some embodiments, the timing system 116 includes a tag reader remote configuration module 174 or a user interface 180 for including, receiving or creating instructions for remotely configuring the tag reader system 114. The communication interfaces 178 and 158 of the timing system 116 and the tag reader system 114 are communicatively coupled for communicating the remote configuration instructions from the timing system 116 to the tag reader system 114. The tag reader system 114 configures one or more operating parameters of at least one of the processor 150, the transceiver 154 and the antenna 112 responsive to received remote configuration instructions. This could also include the remotely attached antenna via interface 156. For example, this can include instructions for adjusting the power of the antenna 112 or other of its features, or any other adjustable operation of the TRS 114 such as the tag read request scan rate. Furthermore, in some embodiments, the tag reader system 114 can periodically or based on an event or on a query request transmit one or more monitored parameters over its communication interface 158 to the timing system 116. In such embodiments, the tag reader remote configuration module 174 of the timing system 116 receives the monitored parameters, analyzes the monitored parameters including comparing of at least one monitored parameter with a predefined parameter value, and determines a remote configuration instruction responsive to the analyzing and comparing. The determined remote configuration instruction is included in the communicating from the timing system 116 to the tag reader system 114. The TRS 114 then configures one or more of its operating parameters responsive to the determined remote configuration instruction. As in the above example, this can include setting of an antenna power level or setting a RFID tag read request scan rate, by ways of related examples. As such, the operating parameter can include by way of example, a tag read request failure rate and a RFID tag read inventory count.

In some embodiments, the tag reader remote configuration module 174 includes a statistical analysis module that track the received RFID tag read messages and the included tag reads and time stamps, and statistically analyzes them. In some embodiments, the tag reader remote configuration module 174 determines at least one of the instructions responsive to the statistical analysis of the received RFID tag read messages.

Exemplary Operation of the TRS

In operation, one exemplary embodiment of method for determining a time of detection of a passive RFID tag 108 relative to a detection line or monitored point MP located along a route R traveled by the RFID tag 108 can include some or all of the following processes:

The tag reader system 114 can receive instructions over the communication interface from a remote timing system 116 including at least one parameter for operation of at least one of the transceiver and the computer implementable instructions;

The tag reader system 114 can update an operating parameter responsive to the received at least one computer implementable instruction.

The tag reader system 114 can transmit via the transceiver 154 and antenna 112 a wake up/powering message such as on a periodic basis defined by an operating parameter as receiving from the processor 150.

The tag reader system 114 can receive a plurality of acknowledgement messages each from a plurality of communicating RFID tags 108 that are in the proximity of the TRS 114, each acknowledgement message including an RFID tag identifier for uniquely identifying that tag 108 from among the plurality of communicating RFID tags 108.

The tag reader system 114 can transmit a first read request to one communicating RFID tag utilizing the unique tag identifier for that tag and receive a first tag read from the one particular communicating RFID tag. The TRS 114 can time stamp the first tag read based on a first time of receipt of the first tag read from the clock and storing the time stamped first tag read in an RFID tag read message in the memory. In some embodiments, the tag reads and time stamps are stored and the tag read message is not yet created. The TRS 114 can then transmit a second read request to the one particular communicating RFID tag utilizing the unique tag identifier for that tag and receive a second tag read from the one particular communicating RFID tag. The TRS 114 then time stamps the second tag read based on a second time of receipt of the second tag read from the clock; and can store the time stamped second tag read in an RFID tag read message in the memory or as raw data. The TRS 114 can also perform certain tasks with the stored data. For instance, the TRS 114 can determine an average time value for each of the first and second tag reads for the communicating RFID tags and store an average time in the RFID tag read message for the one particular tag 108 or more than one tag 108 such that the average time is computed over the reading of multiple tags 108.

In another embodiment, the TRS 114 can determine a number of tag read instances of first and second tag reads associated with the one communicating RFID tag and storing the number of tag read instances in the RFID tag read message.

As noted, the timing system 116 can interface with the TRS 114. As such, the TRS 114 can receive a request from the remote timing system over the communication interface for communicating the stored RFID tag read messages and can create and/or transmit the stored RFID tag read message over the communication interface.

Figure 8:
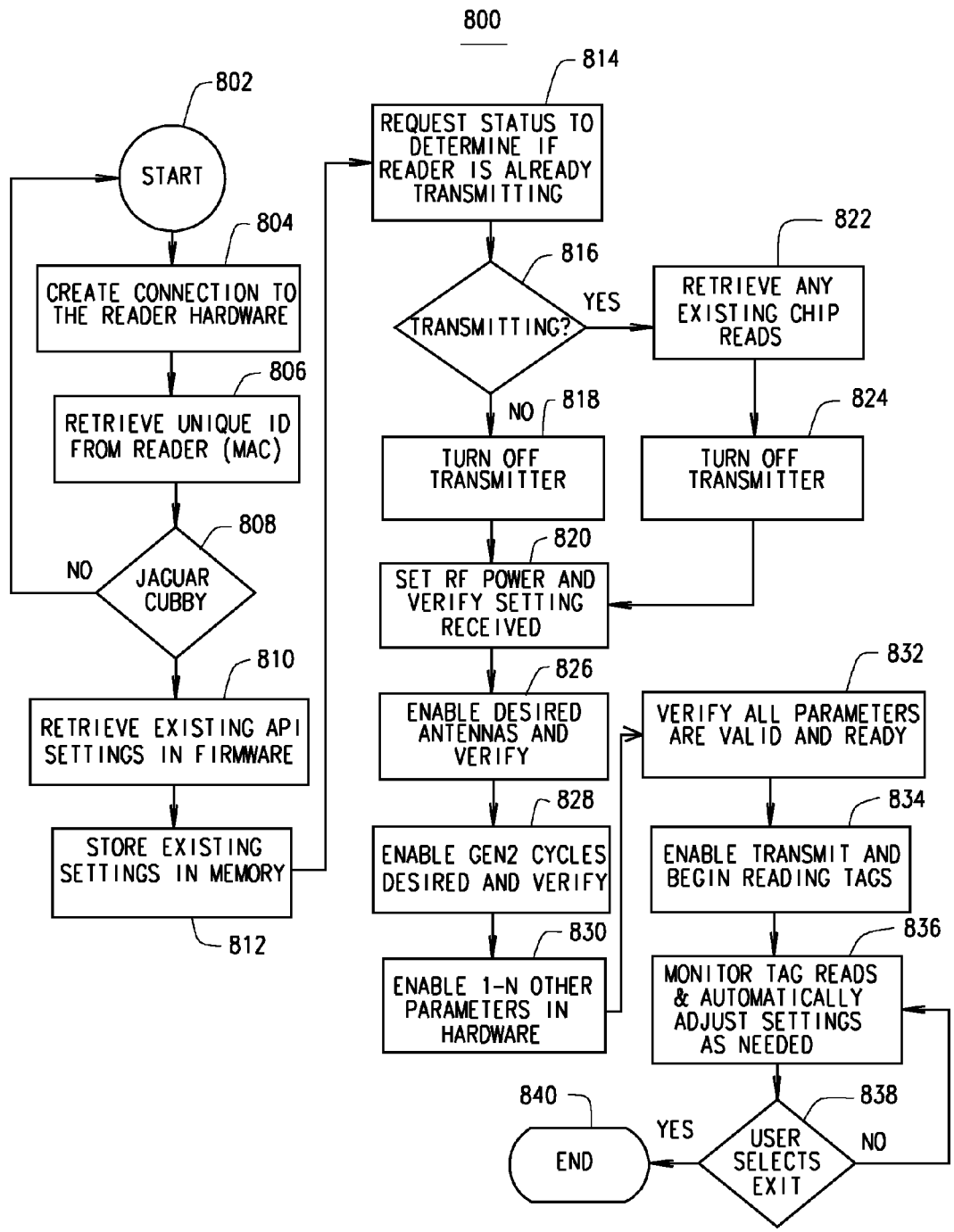
FIG. 8 is a flow chart of a remote tag reader instruction module for remotely providing instructions to a tag reader system from a timing system according to one exemplary embodiment.

FIG. 8 illustrates another method implemented by the TRS 114. As shown in process 800, the process 800 starts at process 802 and a connection is created to the TRS 114 system in process 804 and a unique ID is received back from the TRS 114 in process 806. This is typically a MAC address for the TRS 114. The TS 116 reviews the received unique ID of process 806 and determines if the communicating system is a compatible configured TRS 114 or a different system. As shown here, the TRS 114 is referred to as a Jaguar Cubby in process 808, but the TRS 114 can have other names. If the transmitting TRS is not a TRS 114, the process returns to the start in process of 802. However, if the TRS 114 is a valid TRS 114, process 808 continues the processing flow to process 810 wherein the TS 116 retrieves an existing API settings and continues the method in process 812 by storing the existing settings in memory. Next in process 814, the system 116 transmits a request for the status to determine if the TRS 114 is already transmitting. If it is determined that the TRS 114 is not transmitting in process 816, the TS 116 continues in process 818 to turn off the transmitter and setting the RF power and verifying the setting is received by the TRS 114. However, if the TRS 114 is already transmitting as determined by process 816, the TS 116 retrieves any existing chip or tag reads in process 822 from the TRS 114 and then turns off the transmitter in process 824. The processes continue to process 820 wherein the system sets the RF power and verifies the settings are received in process 820. Next, the method continues to process 826 wherein the desired antennas are enabled and verified as to their enablement. Next in process 828 the GEN2 cycles that are desired are enabled and verified. In process 830 the 1-N other parameters in the hardware are also enabled and the method verifies all parameters are valid and ready in process 832. At that point, the method enables the transmission of tag reads and the TRS 114 begins to make tag reads in process 834. The timing system 116 then monitors the tag reads and automatically adjusts the settings during operation as desired or needed in process 836. At some point after operation has been running, the monitored event will be over and the user of the system can then select an exit in process 838 and the system processing functions and methods end at process 840.

Exemplary Embodiment of a TRS 114

In one exemplary embodiment, the TRS 114 is a lightweight portable timing system that reads UHF RFID tags. The TRS 114 can be ideal for timing sporting events, but it could also be used to record times for any number of purposes. As described herein, the TRS 114 is a complete solution consisting of a hardware device and software for operating the hardware. The TRS 114 hardware can be based on an RFID reader operating at 915 Mhz. This UHF design works with virtually any tag 108 that conforms to the Gen 2 UHF specifications from EPC. For sporting events, TRS 114 has been designed to work with the ITS G-Chip or B-Chip. Both of these tags (chips) 108 utilize a passive design and offer exceptional performance. The backscatter signal from these chips is optimized in terms of total signal strength and both generate an RF pattern that is optimized to work with the internal TRS antenna 112.

The hardware of the TRS 114 can consist of a transceiver 154 designed to operate in the UHF spectrum. The circuit board of the transceiver 154 can include random access memory 152 that can store programming instructions as well as information gathered from tag reads. The memory 152 can have a capacity to store 1,000 chip reads. Once that memory 152 is full, the system 114 can begin to overwriting information at the first memory location. There is also firmware on the tag reader 114 that provides fundamental instructions for operating the hardware. There are also multiple interfaces to external devices including an external antenna, digital I/O port, Ethernet interface, and a serial interface. The Ethernet and serial interface can be used to communicate with the reader hardware for the purpose of programming and operating the reader, as well as retrieving information including chip reads.

TRS 114 includes a high-performance internal antenna 112 that is optimized to provide approximately 6 dBi of gain, while conforming to FCC requirements for maximum power emission. The antenna 112 itself is a dual plane architecture that provides circularly polarized transmission signals. The antenna pattern has been optimized for sports timing through a specialized case design as well as through specific orientation. The housing 120 of the TRS 114 can be constructed of a high-performance ABS-type plastic that has minimal impact to radio frequencies in the UHF spectrum. Multiple plastics have been tested for use with the TRS 114 and the preferred plastic is an ABS plastic with UV protection within the plastic itself. The thickness of the plastic of the housing 120 and the form and size of plastic should be carefully designed to enhance the read performance of the internal antenna 112 within TRS 114.

The housing 120 of the TRS 114 uses a plastic that is approximately ⅛th inch thick. On the top of the housing 120 includes the lid 122 that is a structure that is used to encase the electronics within the cavity 113. This lid 122 is also floating above the antenna 112 and its height above the antenna 112 can be varied to modify the transmission and reception performance of the antenna 112. The standard TRS 114 uses a height of approximately 0.75 inches at this time. This height was chosen after exhaustive testing and it was determined that the radiation pattern of the antenna could be optimized to provide consistent read performance at a distance of up to 25 feet away from the antenna using a ITS G-Chip or B-Chip. In addition, the plastic housing 120 is beveled/sloped on all sides 126 leading from the narrower area of the bottom 124 of the housing to the larger area of the lid 122 connection point. This slope provides additional distance from the antenna 112 to the sides 126 and this provides enhanced performance in lateral directions from the center of the antenna 112. For sports timing, as well as many other applications, this enhanced ability to read tags left and right of center of the antenna 112 provides much improved read performance. Tests have shown that the TRS system 114 can read tags at a distance up to 6 feet on either side of the center beam of the antenna 112 at a distance of 2 feet in front of the antenna. The plastic housing 120 has a design that provides these benefits in part due to the loose coupling of the plastic to the antenna.

TRS 114 also provides the ability to favor signals in particular directions. When TRS 114 is mounted properly with the cable exit on the right-lower portion of the case, the antenna will favor tags that are in a horizontal orientation in an area directly in front of the antenna 112. If tags 108 are going to be placed in a vertical orientation, the housing 120 case can be rotated 90 degrees to provide enhanced performance in a vertical orientation.

In addition to the internal antenna 112 built into TRS 114, an external antenna interface 156 can include a jack for connection to a second antenna. The second antenna will permit a user to place a single UHF antenna at an additional location within about 50 feet of the TRS 114. The external antenna must provide about a 50 Ohm load and operate at a center frequency of about 915 Mhz. The cable chosen must provide minimum signal loss and recommended cables would include typical industry types including LMR-240 or LMR-400.

TRS 114 communicates over facility 118 with the timing system 116. This program controls nearly every function within the reader hardware. The timing system 116 software has the TRS module 174 for controlling the TRS 116 and provides control over necessary functions including power levels transmitted, most Gen 2 commands, tag read times, and other functions necessary to read tags within the RF field. The module 174 within the timing system 116 interfaces with the hardware to collect tag reads and deliver those tag reads to other modules that process the read information. Tag read information will include a serial number, tag time, and other typical G2 fields of information.

The TRS system 114 has been tested in both laboratory experiments as well as actual sporting events. In laboratory and internal controlled tests, the system has been shown to read as many as 40 tags-per-second with an average read success of 99.9%. TRS 114 has also been tested in sporting events including running races with as few as 250 participants and as high as 1,200 participants. Average read success rates have been approximately 99%, when the participants have the opportunity to wear the tag in many locations upon their body on a sports bib. In more controlled experimental running races, the system has delivered average read performance exceeding 99.5%. This occurs when the tag is placed on a bib in a horizontal orientation on the front of the runner's body. This is the ideal location for the tag and it been shown to work well.

The TRS antenna 112 and hardware architecture cab be optimized for superior performance for timing of running or cycling events when the unit is mounted at a height of approximately 7 feet above the ground on a scaffold structure. The ITS tower arch structure or gantry 115 can provide a 10-foot structure with an average internal width of approximately 8.5 feet. This width is ideal for the system because TRS 114 provides complete coverage of the monitored zone $MP_z$ since TRS 114 can read up to 6 feet on either side of the center point of the monitored point MP. In fact, TRS 114 could be used on a wider structure at a width of perhaps 12 feet, given that a few tag reads may be missed. The recommended maximum width is 10 feet as this leaves plenty of margin for error when reading tags.

TRS 114 has also been tested at triathlon events where a specialty tag such as the ITS T-Chip is used on an ankle strap of the athlete. These specialty tags are quite small and typically worn on the lower-leg of the participant. The TRS system 114 is capable of reading these small tags 108 at a distance up to 8 feet. The antenna 112 within TRS 114 has no null points within 8 feet of it. Thus, it is ideal for reading small tags 108 in sporting events. In races where TRS 114 has been tested, the TRS 114 has had read successes that averaged above 99% which is higher than previous RFID tag reader systems.

The total number of applications for TRS 114 is extensive. Although it was designed for sporting events, it could also be used in numerous industries such as transportation, healthcare, manufacturing, etc. The TRS product and system and method as described herein can work with any RFID chips or tags. While the system as described herein works with the Gen 2 UHF compliant tags, the opportunities to use TRS 114 with other systems and in non-event related tag reading applications are not to be considered limiting to the present disclosure.

In some embodiments using passive RFID tags 108, the timing system (TS) 116 can include one or more tag reader systems (TRS) 114 that continuously transmit or pulse an energy signal or message from connected antenna 112 in order to activate and power the tags as they move through the monitored positions. Each passive RFID tag 108 has a very small capacitor which can continue to power up the tag for anywhere from about 0.1 to about 2 seconds. Depending on the velocity of the tag 108 through the monitored zone $MP_Z$, the activating messages need to be transmitted such that the tags 108 can be activated and can provide one or more reads while the moving tag is within the monitored zone $MP_Z$. For instance, in one embodiment, the activating messages for use in a marathon race can be at a rate of one for every about 0.008 seconds. Again, it is desirable to provide enough RF energy in the monitored zone $MP_Z$ or field to keep all of the moving RFID tags 108 powered up while in the monitored zone $MP_Z$.

The transmitted activation message can include powering as well as the read request, for example consistent with the provisions of the Generation 2 (G2) protocols for passive RFID systems. The messaging between the tag reader system TRS, its antennas and the passive RFID tags can be handled in various ways to accomplish the transmission of RF energy to the tags within the G2 protocol to power them up and obtain the tag read. For instance, this can be using separate messages or can include sending a read request that also provides the RF energy needed for the tags to power up. In some embodiments, a wakeup signal can energize the moving tag when it comes within range of one or more antennas, and then subsequently a read request message can be sent after the tag is activated. Of course, other embodiments are possible as known to those skilled in the art of RFID systems and in particular G2 systems, and still considered within the scope of the present disclosure. However, in tracking and reading numerous moving tags through a monitored position, the messaging between the tag reader system TRS and the tags most desirably will provide for a rapid power-up of the tag and rapid reading of numerous tags that may be within the same monitored position or zone, e.g., the same RF field of the antenna of the tag reader system TRS.

As one such exemplary embodiment implementing the G2 standards, the tag reader system TRS and tag can perform the method steps of:

a. Each TRS transmits an energy activation signal.

b. The TRS system also sends a QUERY command. This QUERY command can also be the activation signal, or a separate signal. Each of these is transmitted on a pulsed basis by each antenna coupled to the TRS.

c. Each tag receives the activation signal and then also receives the QUERY command.

d. Once the QUERY command is received, each tag generates a random 16-bit number and transmits the 16-bit number (RN-16).

e. The tag reply is received by the TRS and the RN-16 is logged.

f. The tag reply is received strongest by the near antenna that stamps it with the antenna identifier and sends it in a packet to the TRS.

g. The TRS logs the RN-16 along with the antenna identifier.

h. The TRS then sends out an echo Read Request message that includes the received RN-16. Where the antenna identifier is provided, the read request message can be sent to the same antenna or to all antennas within the tag reader system TRS in order to maximize the operation of reading the moving tag.

i. The tag receives the uniquely addressed (RN-16) read request and then provides the tag read with the tag EPC/number along with the other requested data.

As known to those skilled in the art after reviewing the present disclosure, the use of the RN-16 as generated by the tag, provides the ability to set up a one-on-one or point-to-point packet communication session between the tag and the tag reader system TRS, and in some cases specifically through one antenna from among a plurality of antennas associated with a TRS system or associated with a monitored reference line. Additionally, the use of the RN-16 can also provide that each tag reader system TRS will only perform a single read request and single tag read from each tag. However, it should be understood that this tag reading process is only one exemplary embodiment and others are also within the scope of the present disclosure.

Additionally, some TRS systems can utilize more than one antenna to increase or expand the tag read zone (monitored zone $MP_Z$). In such embodiments, the RF messaging for powering and/or read requests can be sent simultaneously from all antennas or can be sent individually from the tag reader system TRS transceiver to each coupled antenna. In the later embodiments, unique messaging and identification of each antenna may be required and the tag reader system TRS transceiver would be equipped or configured to provide for unique addressing and communications with each antenna. The TRS transceiver can therefore send messages separately across the various antenna fields essentially creating sub-monitored RF zones within the tag reader system TRS monitored position.

After the passive RFID tag is powered up, the read request can be transmitted to obtain a response from the tag to provide a tag read to the tag reader system TRS. Such a read request can be provided under the G2 protocol directly between the tag reader system TRS and each tag based on its provided address. Once each tag receives its previously provided address, the chip transmits the tag read data back to the tag reader system TRS. The transmission between the tag reader system TRS, its antenna and the RFID tags using one or more frequency channels and messages can be pursuant to any defined protocol and communication capability, with the G2 standard only being one exemplary such embodiment.

In some embodiments, an RFID monitoring systems composed of one or more tag reader systems TRS is positioned at a start line, a check point or intermediary point and at a finish line of a race track for a racing event. Each tag reader system TRS logs one or more time stamp entries per tag and transmits the tag reads and times in a tag read message to an RFID timing system. As such, each of the received tag reads and times are used in a calculation of the determined tag read for that monitored position. This can also include a substitution of a one or more supplemental tag reads where it is determined that such is more accurate than one or more of the other tag reads or where one or more tag reader systems TRS fails to make a read from a particular tag. All of the tag reads and the final determined tag read are logged by one or more of the tag reader systems TRS or timing systems (TS) with each tag number with a time stamp that has been adjusted to the common reference line.

When timing an elapsed time between two points, there are two primary ways that this can be handled. In the first embodiment, it can be assumed that all tags cross the start or first point at the same time. In such embodiments, all lapsed times are determined using the same clock and the lapsed times are essentially the total times. This method is suitable for many races, but is not suitable for races where there is not a common start time. This is also the situation where the current systems are used to track times of tags in and out of locations that are other than a racing event or track. In the second embodiment, a monitored position is established at the beginning or entry point with one or more tag reader systems TRS determining the actual start time based on a common timing clock. A second monitored position with one or more tag reader systems TRS read the tag at the end to determine the actual end or finish time using the common timing clock. The total elapsed time is determined to be the difference between the two. In such embodiments, the common timing clock set time must be provided to each tag reader system TRS in the system and at each monitored position so that the determination of the total elapsed time is accurate.

The time stamp can be provided in the tag reader system TRS using tag reader system TRS hardware and/or software at the time of receiving a tag read. Each tag reader system TRS has an internal clock that time stamps the tag read with a suitable degree of accuracy. For example, in some embodiments the internal clock and time stamp functions can provide for a time stamp that is accurate to the $\frac{1}{1000}$th of a second. As such, it is important to synchronize each clock in each tag reader system TRS and between timing systems or tag reader system TRS so that the common timing clock is synchronized to the same degree of desired accuracy. As addressed herein, a SYNC message can be provided from a common clock or a single clock within the coupled timing system TS and tag reader systems TRS as a master clock. Each secondary or slave clock then updates or resets the time to this received common clock. In some embodiments, the received timing message can also be adjusted to take into account any transmission delays of the SYNC timing message if known or predictable.

The tag read or tag read packet or data sent from each RFID tag can vary based on the application but generally includes at least a unique tag identifier or identification numbers or code. This can also include the RN-16 number or other communication identification number. Each tag reader system TRS receives the tag read packet by at one or more antennas associated with the tag reader system TRS. The receiving antenna transmits the received tag read back to the tag reader system TRS as received or can add to the tag read packet additional antenna specific data. Such antenna specific data can include an antenna identification number or identifier that uniquely identifies the antenna. Additional antenna information can also be provided if desired. This can include RF data associated with the received tag read packet such as, by way of example, RF energy levels or signal strengths of the received tag read packet, directional data indicating a direction of the received tag read packet if determined by the antenna, and/or the geographic location coordinates or GPS location of the antenna.

The tag reader system TRS receives the tag read packet from one or more antennas. The tag reader system TRS time stamps the tag read packet with either the time of the internal clock at receipt, or an adjusted time that adjusts the time of receipt based on any known or determinable communication delay in the tag reader system TRS. In some embodiments, each TRS system stores this information in a local TRS memory such as a resident database application in a local memory storage device. The tag information can also include any type of data, including a tag identifier or identification number, information related to the owner of the tag such as in a race it can include a bib number or name of a participant. However, any other data suitable for use in the application is also possible.

Additionally, other information can be added to the tag read packet or store such as where the same tag has been read by multiple antennas or multiple times by the same TRS. In such cases, these additional tag reads can be grouped and/or the total number of times that a tag was read by a single system or by each antenna in a TRS can be stored or added to the packet. As noted above, in some systems where directional monitoring or identification of the tag at reading is possible, the TRS can be configured to determine a velocity of the tag through the monitored zone. This velocity information can also be added to the tag read packet.

Some or all of the tag read packet/data can be prepared as a tag read message that is sent or transmitted by each TRS to a timing system TS that is coupled to each TRS monitoring the same monitored zone having the same virtual/physical reference line.

In some cases, the tag read message having the number of times a tag was read by each TRS, can enable the timing system TS to consider the total number of times each tag was read at the monitored line for use in determining the determined time of passing, the validity of that read or the validity of other different tag reads that were submitted by one or more of the TRS systems.

In other cases where the antenna identifier is recorded and transmitted to the timing system TS, the antenna identifier can be used to help us identify the operation and balancing of each TRS. In addition, such information can be utilized in the determining of the determined time of passing and/or the validity of the tag read or other tag read. Of course, one skilled in the art will understand that the antenna and system information such as this can also be utilized for operation and maintenance of each TRS such as ensuring that all systems are operating as desired or in trouble isolation within the system.

TRS-TS Communications Interface

As described herein, the communications systems and protocols of the timing system TS and the Tag Reader Systems (TRS), collectively referred herein as a sports timing system (STS) by way of example, can implement an Integrated Communications System (ICS), method and/or protocols that support the transmission of information using variable length messages that can be customized by an STS user. The information can be transmitted via numerous technologies including, but not limited to, wired networks, wireless networks, satellite networks, cellular networks, serial networks, or private networks. The messages can be transmitted over any type of network communications protocol including, but not limited to, TCP/IP or UDP. The protocol uses a plain text message format that can be modified to include any number of new message types. A number of pre-defined messages are available for the transmission of typical sports timing information between systems. In addition, new messages can be added by utilizing a packet structure containing message type indicators at the beginning of the packet, and the EOM| end of message identifier that tells the receiving system that all information for that particular packet has been received. These indicators make it possible to parse individual information packets that are being received in a constant stream. The contents of the information packets use a variable length text message format. There are pre-defined messages for handling many of the common information exchanges often used in sports timing.

The ICS was designed for sporting events, it could be used for any number of other applications. Furthermore, while the ICS will be described in conjunction with the current embodiments, it will be understood that they are not intended to limit the protocol to these embodiments. On the contrary, the design solution intended to cover alternatives, modifications and equivalents, which may be included within the spirit and scope of the design solution.

In one exemplary embodiment, a system for communicating sporting event timing information among a plurality of timing systems, the system includes a sport timing system (STS) having a data interface, a memory and a processor. The data interface is for communicating over a data communication network. The memory includes executable instructions for operating the data interface to communicate over the data communication network and for storing participant data including participant data that includes a participant identifier for uniquely identifying each participant and participant timing data. The participant identifier can be a bib number or a participant identification number for example.

The processor is coupled to the memory and the data interface and executes the executable instructions for operating the data interface to transmit datagram messages over a stateless packet data communication network wherein the datagram messages include multicast and unicast messages, each of which includes at least a portion of the participant data. The stateless packet datagram message protocol can be a user datagram protocol (UDP) in one exemplary embodiment, but can be other such protocols in other embodiments and for use on other stateless packet data communication networks. In some embodiments, a portion of the predefined message can include a uniquely assigned packet number that is a next sequential number for that particular data interface.

As shall be discussed a plurality of timing systems TS and TRS can implement the described ICS network interface systems and method. In some embodiments, a single event will include a few to as many as a dozen or more timing system TS and/or TRS systems such as for a cross country race or multi-kilometer bicycle or triathlon, each of which when implementing the timing system TS and tag reader system TRS can share event and individual participant data. Often in such STS systems, a single system will act as the primary or master for compiling the final race results for each participant. However the other timing system TS and/or TRS systems cooperate to provide race timing services and support such as racer registration, start times, intermediate detections and times, by way of example. As such, as will be described in some embodiments herein, a first and second timing system (TS) is possible, but such systems can have multiple first or second such timing system TS and still be within the scope of the present disclosure. As such, each of the above may be a first TS system and a second TS system will have second components. However, each will access the same or coupled data communication network using the stateless broadcast protocol using the plurality of predefined multicast and unicast messages including the portion of the participant data.

Of course, one or more of the STS systems may have a timing clock that provides a present time signal. A second data interface can provide for the receiving of participant detection data from a tag reader or other detection system when the detection system detects proximity of a participant in the sporting event to a predefined detection point associated therewith or monitored by such detection system. Generally, executable instructions in the ICS provide the processor with the ability to determine the participant timing data responsive to the received participant detection data and the present time signal. These components may be separate components with separate processors, memories and data interfaces or may be assembled as a single unit.

As known, each TRS system or other detection system, such as an can have one or more RFID tag readers. When detecting RFID tags, the RFID reader detection systems detect the RFID tag number uniquely assigned to the detected participant and this can become the participant identification and included in participant data.

As noted and described in detail below, the multicast messages include an identification of an originating STS system but do not include an identification of an intended receiving STS system. In other words, the recipient knows who sent the message but any listening device can receive the message based on their screening on the sender. Such, multicast messages can include one or more of the later descried messages: READ, TSYNC, and RSIG, by ways of example and not intending to be limited thereto. Similarly, the unicast messages include both an identification of an originating STS system and an identification of an intended receiving STS system, and as such are a point to point message that is transmitted within the broadcasting message structure. The unicast messages can be, for example, message such as will subsequently be described to include, but not limited to, RESEND, LOOKUP, STARTRFID, STOPRFID, and COMMAND.

In addition to the multicast and the unicast messages, the data interface can communicate using the stateless broadcast protocol by one or more broadcast messages that do not include an identification of an originating STS system or an identification of an intended receiving STS system, and therefore are purely broadcast messages. These can include messages such as system level messages and can include the TRSTART message by way of example as will be further described herein.

In yet another embodiment, the TS and TRS systems can include a data interface of a timing system for communication over a coupled data communication network to cause a computer for storing in a memory participant data including participant data that includes a participant identifier for uniquely identifying each participant and participant timing data and transmitting, via a data interface, datagram messages over a stateless packet data communication network, datagram messages including multicast and unicast messages including at least a portion of the participant data. The system and methods can include the following process steps, the order of which is not significant, as other orders are possible and each of which are still within the scope of the present disclosure:

a. providing a present time signal from a timing clock;

b. receiving at a second data interface participant detection data from a detection system responsive to the detection system detecting a proximity of a participant in a sporting event to a detection point;

c. determining in a processor the participant timing data responsive to the received participant detection data and the present time signal;

d. storing a plurality of the participant data in the memory including the determined the participant timing data;

e. wherein the detection system is an RFID tag reading system having one or more RFID tag readers and wherein the participant detection data includes an RFID tag number uniquely assigned to the detected participant, communicating with the RFID tag reading system and receiving the participant detection data including a RFID tag number of the detected participant's RFID tag;

f. transmitting the datagram messages using user datagram protocol (UDP);

g. storing an identification of the STS system, and formatting the multicast datagram messages to not include the stored STS identification in the multicast message but to include an identification of an intended receiving STS system, and formatting the unicast messages to include the stored STS identification and to include an identification of an intended receiving STS system;

h. formatting multicast messages are selected from the group of message consisting of: READ, RESEND, TSYNC, and RSIG; and wherein the unicast messages are selected from the group of messages consisting of: RESEND, LOOKUP, STARTRFID, STOPRFID, and COMMAND;

i. storing an identification of the STS system; formatting one or more broadcast message to not include the STS identification or any identification of an intended receiving STS system; and transmitting via the data interface the one or more broadcast messages;

j. formatting the participant identifier in the format selected from the group consisting of a bib number, and a participant identification number; and k. wherein one or more of the predefined messages includes a uniquely assigned packet number that is a next sequential number for the data interface.

Of course, other steps and processes are also possible as will be understood by one of skill in the art of timing systems.

A message as described herein can include a variable length message information packet structure that is used to communicate event data. This packet may contain any type of information and the format of the packet includes the following: message type, source, custom field(s), and end of message indicator. Several message types are already defined, as documented below. However, the message type may contain any text that uniquely identifies a message. The system receiving the message will use the message type to determine the action required. The next field in the packet includes the source. The source is a name or unique identifier that indicates which system transmitted the message. This information is used by the receiving system to know where to send a response. The source field can include any text, but typically, the IP address of a computer or device is used. The next fields within the packet are customer fields that may contain any type of information. The flexibility of the protocol makes it possible to send any type of information from one system to another. The final field that should be included in each information packet contains EOM|. This is the end of message indicator that is used by the receiving system to know when all information within a packet has been received. The packet also uses the | character to delimit each field.

The timing system TS and TRS facilitates and streamlines the communication of tag reader or participant detection system timing information between multiple computers used at sporting events. The protocol is flexible and adaptable and can be used to transmit any type of information across any type of network. The use of variable length messages makes it possible to customize the messages sent or received from any type of device. The protocol is simple and efficient and can be quickly implemented.

The foregoing descriptions of specific embodiments of the present design have been presented for the purposes of illustration and description. They are not intended to be fully exhaustive or to limit the design to the precise use, form, or methods disclosed, and it is obvious that many modifications or variations are possible in the light of the information provided above. The embodiments were chosen, shown, and described in order to best explain the concepts and principles and the practical application of the design, thus providing others skilled in the art the ability to best utilize the design and various embodiments with various modifications as are suited to the particular use desired.

Some of the advantages of the timing system TS and TRS include facilitating and streamlining the communication of tag reader or participant detection system timing information (such as RFID systems by way of example) between computing systems of similar or non-similar nature. For example, the protocol would permit the communication of sports timing information between desktop computers and cellular phones.

In addition, a network interface provides an ability to communicate with STS in real-time. The file interface is very quick and easy to use. The network interface is much more complex and can require experience in writing network applications. In addition, as described herein one skilled in the art of this timing system TS and TRS network interface and method requires an understanding of any operating systems environments in which the present timing system TS and TRS system and method are implemented. As such, it is assumed that any person of skill in the art implementing the present timing system TS and TRS system and method is well versed in such implementing operation system environment.

The timing system TS and TRS systems that make up an STS or similar RFID tag reader system can have a state-less network interface such as provided by a user data protocol (UDP) system as used for outbound and inbound messaging over a suitable communication network. The timing system TS and TRS system utilizes these messages to include outbound packets using timing system TS and TRS for READ information, as well as other data as described herein. In addition, an STS using timing system TS and TRS monitors the Internet connection for UDP timing system TS and TRS messages from other timing system TS and TRS systems or third-party programs coupled to the same communication network. This interface allows third-party programs to be developed which can work within the STS architecture.

The following includes the packet structure for all timing system TS and TRS supported UDP packets. Timing system TS and TRS can be configured to listen and send on any socket ranging from 5000 to 9999. In addition, timing system TS and TRS can be set to send to a specific computer by using either the computer name or its IP address. Furthermore, timing system TS and TRS can send to all computers on the network by using 0.255 as the last bytes in the IP address. Of course in other systems and embodiments other broadcast messaging address can also be used and still be within the scope of the present invention. In this example, if the timing system TS and TRS have an IP address set to 192.168.1.255, the timing system TS and TRS sends its messages as Broadcast packets. Timing system TS and TRS message are sent as clear text contained within the UDP packet, with fields separated by the "|" characters. |EOM| should always come at the end of each message.

As noted, the timing system TS and TRS network interface is configured for stateless broadcast communications systems, such as UDP using a broadcasting IP address indicator such as 255. The networking interface can however support a variety of different types of messages. These can include broadcast messages, multicast messages and unicast messages, between and among various timing system TS and TRS systems.

Broadcast timing system TS and TRS messages are transmitted from the timing system TS and TRS interface over the stateless broadcast communication network with no addressing as to the intended recipient as well as no identification the timing system TS and TRS system that is sending or sent the message. As such, each of the Broadcast timing system TS and TRS Messages can be read by any listening timing system TS and TRS device, and once received by that device, the receiving STS system does not know which other STS system sent the message. As will be discussed, these include, by way of example, the TRSTART messages.

Multicast timing system TS and TRS messages are transmitted from the timing system TS and TRS interface over the stateless broadcast communication network with no addressing as to the intended recipient. However, these messages include an identification of the sending STS system, e.g., FROM identifier. These timing system TS and TRS multicast messages can be read by any timing system TS and TRS system and once received by that STS system, the receiving STS system knows which of the other communicating STS systems the message originated. These include, by way of example, the READ, RESEND, and TSYNC, RSIG, and KREFRESH messages.

Unicast timing system TS and TRS messages are transmitted from the timing system TS and TRS interface over the stateless broadcast communication network with an identification of which the sending entity is (FROM identifier) as well as an identification of the intended receiving STS system (DEST or Destination identifier). These unicast timing system TS and TRS messages are essentially point to point messaging within a stateless broadcast messaging communication system. Only the identified destination timing system TS and TRS system should receive these messages and they are ignored by all other listening STS system. The receiving STS system knows that the message was intended for its use and it knows the identification of the sending STS. These include, by way of example, the RESEND, LOOKUP, STARTRFID, STOPRFID, and COMMAND messages by way of example.

It should be understood to those skilled in the art that other broadcast, multicast and/or unicast messages can also be developed as an application may require or benefit from the present disclosure, and still be considered within the scope of the present disclosure.

The following is just one set of possible message descriptions and definitions, according to one embodiment.

Read Message (READ): This message can be sent from a system that has just read a participant tag. The message could be sent to any other device and the message includes the tag serial number just read. It also includes the time of the tag read as well as an optional packet number. The READ message is the primary information packet used to communicate tag read data to all devices. The packet could be expanded to include additional fields as necessary. The READ packet is sent by timing system TS and TRS to the network and can be captured by any device that is listening on the network for UDP packets. The packet is a real-time feed of any reads that are occurring at the particular STS timing system.

Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested.

Additionally a separate READ message can be used that includes the PARTICIPANTNAME field in lieu of the BIB#.

Resend Message (RESEND): This message can be sent from a receiving device to a transmitting device to request another send of a particular packet. If packet numbers are being used for the purpose of verifying that all packets are received, the re-send message can be used to request another transmission of a packet that never arrived at the receiving device. The packet could be expanded to include additional fields as necessary. The RESEND message is sent between any timing system TS and TRS system to questing that it re-send a past message. If a message is lost over the network, a request to resend can be made for any of the last 999 messages sent previously. Timing system TS and TRS maintain a buffer with the past 999 messages. Once the 999 position is used, timing system TS and TRS start over at position 1. Thus, timing system TS and TRS are maintaining a circular buffer of messages.

Packet length=variable size
Total fields=5
RESEND|FROM|DEST|PACKET #|EOM|

The Destination field is the STS system that should respond to this request. This is the same name set in the STS Defaults for "My Name" in the networking section. If a request is made for a packet number that has not yet been used by timing system TS and TRS, a packet response starting with the BLANK field can be received.

Time Sync Message (TSYNC): This message can be sent to all devices on the network to indicate the current time at the transmitting device. This message is used to synchronize the time on all devices, which is crucial for RFID systems that are used for timing sporting events. The TSYNC message is sent using timing system TS and TRS to any STS system that is listening for Time Sync commands. This is typically used by a STS system to make sure the time on its clock is the same as that of the interconnected systems. There can always be a slight delay in the network transmission, and as such, a 0.25 to 0.5 second delay may be added to the time received using timing system TS and TRS to compensate for the delay.

Packet length=variable size
Total fields=4
TSYNC|FROM|TIME|EOM|

The FROM field is the name set in the STS Defaults as My Name.

Remote Signal Message (RSIG): The RSIG message is sent using timing system TS and TRS to any system that is listening for RSIG command. This is typically used by STS Remote to make sure the connection over the network is good to timing system TS and TRS and also to verify that timing system TS and TRS is scanning and listening for remote entries.

Packet length=variable size
Total fields=4
RSIG|FROM|TIME|EOM|

The FROM field is the name set in the STS Defaults as My Name.

Lookup Message (LOOKUP): This message allows a TRS or TS system to request race information from another device. The identifier may be any text. In most cases, the identifier will be a tag serial number, race bib number, participant name, or perhaps a unique identifier that refers to a particular type of information. For example, if a TRS or TS system needs to know the current duration of a race, the LOOKUP message could be sent to a time system that is tracking the total race time. The identifier field might contain the text entry "RACETIME" and this entry could be used to indicate that the race duration is desired. The packet number field is optional and if not used, the field could contain a single space. The LOOKUP message allows a timing system TS or TRS (both referred as a STS system herein) to request race information from another device. The identifier may be any text.

Packet length=variable size
Total fields=6
LOOKUP|FROM|DEST|IDENTIFIER|PACKET #|EOM|

Start RFID Message (StartRFID): This message could be sent to a TRS to indicate that it should start performing a specific tag reader or participant detection function. If the function is to begin at a certain date or time, the TIME field could contain that information. This field could be used to initialize and start a remote participant detection system so that it begins to read tags. The StartRFID message can be sent to a TRS or timing system TS to indicate that it should start performing a specific RFID function. If the function is to begin at a certain date or time, the TIME field could contain that information. This field could be used to initialize and start a remote RFID system so that it begins to read tags. As also, as used here this is specific to RFID readers. It should be understood to those skilled in the art, that other reader or detection systems are possible and in such embodiments, other messages can be developed or this message can be adapted for their use.

Packet length=variable size
Total fields=7
StartRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Stop RFID Message (StopRFID): This message could be sent to a TRS to indicate that it should stop performing specific participant detection or tag read function. If the function is to stop at a certain date or time, the TIME field could contain that information. This field could be used to stop a remote tag reader or participant detection system so that it no longer reads tags. The StopRFID message can be sent to TRS or attached device to indicate that it should start performing a specific RFID function. If the function is to begin at a certain date or time, the TIME field could contain that information. This field could be used to initialize and start a remote RFID system so that it begins to read tags. Other systems could include: laser detection, video detection, etc.

Packet length=variable size
Total fields=7
StopRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Command Message (COMMAND): This message could be sent from a TS to a TRS or from a TS to a TRS to request that a particular command be executed. The IDENTIFIER field may contain any text desired. This field could be used to send any tag reader or participant or tag detector command to a remote device. For example, if the current battery charge level on a remote system needed to determined, a Command message could be sent with the text BATTERYSTATS in the IDENTIFIER field. The remote system would need to have functions built in that can process the command.

Packet length=variable size
Total fields=6
COMMAND|FROM|DEST|IDENTIFIER|PACKET #|EOM|

The following provide additional specifications for the communications interface in some exemplary embodiments.

a) UDP packets are not guaranteed to be delivered on a network, as is the case with TCP. In some networks, routers cannot automatically send UDP packets unless they are configured to do so. For the TS and TRS communication system as described herein, the router should be able to send UDP packets, as well as a broadcast datagram.

b) In some embodiments of the timing system TS and TRS communication system, an STS system can only process inbound messages while it is connected to the timing system and the timing system TS and TRS software is Enabled and Scanning. In such embodiments, if packets of information are sent to the timing system TS and TRS, such sent packets will be discarded unless in the Scanning mode.

c) In some embodiments, a timing system TS and TRS system can send and receive messages only if configured to do so in the software defaults. As such, the defaults should be set properly and enabling system/software may need to be rebooted after making any changes to ensure that the networking functions have started properly.

e) There are no error messages sent using timing system TS and TRS if packets are transmitted with an improper format. The malformed packet is discarded.

f) While STS is scanning for chip reads, it can check the network packet buffer approximately every 1 to 3 seconds for new messages that have been received. The communications between the timing system TS and TRS uses an automatic load balancing system for packet processing. If STS determines that the chip read load is lighter than normal, it can speed up the processing of inbound messages using a timing system TS and TRS application. Thus, it is possible that STS could process as many as 20 messages every second. Thus, in some embodiments, less than 20 messages per second should be sent to the TS by the TRS system.

g) When the timing system TS and TRS are sending out messages, it cannot process inbound messages until the send can have completed.

h) The volume of messages coming via timing system TS and TRS can be quite large during a major race, so it is desirable that any code be able to quickly process these messages. Depending on the type of race or event being monitored by the timing system TS and TRS system, as many as 300 messages per second is possible.

i) All timing system TS and TRS applications use one socket for outbound packets, and a different socket for inbound messages. Thus, any timing system TS and TRS application should use the sockets designated in the timing system TS and TRS specification be connected by the timing system TS and TRS communication system and method as described herein.

Timing System TS and TRS Interfacing Application Example

The following is pseudo code for creating a TS and TRS UDP client application. This is simply an example of the type of timing system TS and TRS communication code that can be implemented using the timing system TS and TRS system and method as described herein.

```
int main( )
{
    int socketnum;
    struct socketnumaddress_in server_address;
    struct hostloc *host;
    char packet_data[128];
    host = (struct hostloc *) gethostbyname((char *)"192.168.1.255");
    server_address.sin_family = AF_INET;
    server_address.sin_port = htons(6002);
    server_address.sin_addr = *((struct in_addr *)host->h_addr);
    bzero(&(server_address.sin_zero),8);
    while (True)
    {
        printf("Type EXIT when done.");
        gets(packet_data);
        if ((strcmp(packet_data, "EXIT") == 0))
```

-continued

```
{
    printf("Program done.");
    exit;
}
sendto(socketnum, packet_data, strlen(packet_data), 0,(struct socketnumaddress*)&server_addr,
    sizeof(struct socketnumaddress));
}
```

Figure 6:
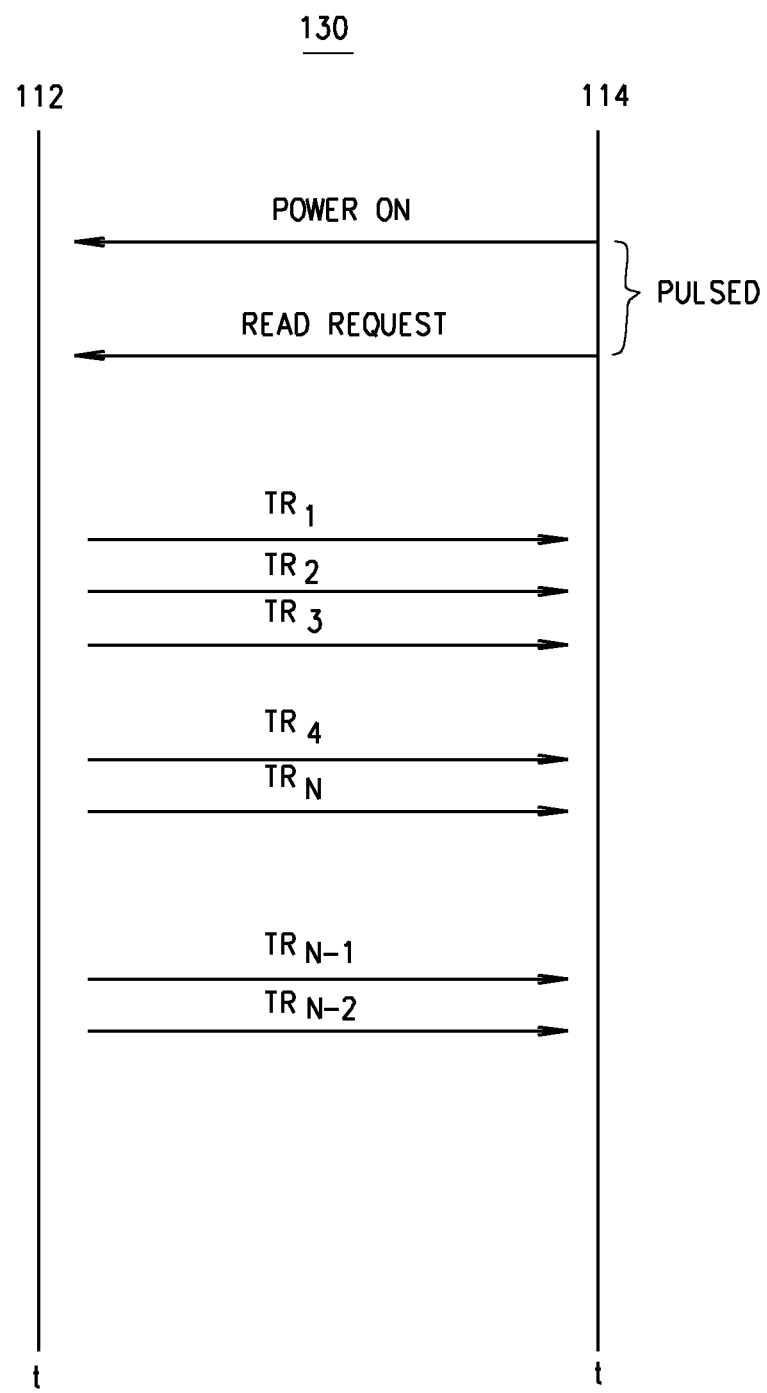
FIG. 6 is a timing diagram of a communication protocol showing three tag reads by a TRS system at a single monitored position for a single-point RFID tag reader system according to one exemplary embodiment.

FIG. 6 illustrates a timing diagram 130 for the communications between antenna tag reader systems 114 and antenna 112 as tag 108 passes by a monitored point MP. As shown, the tag reader system 114 transmits a power on message and a read request message to each antenna that gets transmitted at the monitored point MP. Each of these is pulsed wirelessly and continuously by antennas 112A, 112B and 112C that are located at the same monitored point MP. A first set of antenna tag reads $ATR_{A1}$, $ATR_{B1}$ and $ATR_{C1}$ are received by a tag reader system antenna 112 from the tag 108. Each of these is received from different antenna 112A, 112B, and 112C at the MP, and hence the first sub character of the antenna reads correlating therewith. As the tag 108 continues to move and time lapses and the tag continues to transmit tag reads that are received by the tag reader system 112 as $TR_1$, $TR_2$, and $TR_3$. The tag continues to move in range of the antenna 112 and final antenna tag reads $TR_4$, $TR_N$, $TR_{N-1}$ and $TR_{N-2}$ are obtained from antenna 112. Each of the three antenna tag reads per antenna are communicated to a coupled tag reader system 114 all while the tag 108 is within proximity to the same monitored point and in wireless communication with the antenna 112. In this embodiment, all antenna tag reads occur at a single monitored point having multiple antennas. The processes discloses herein determine the actual passing of tag 108 by this monitored point MP in view of these multiple antenna tag reads.

Figure 7:
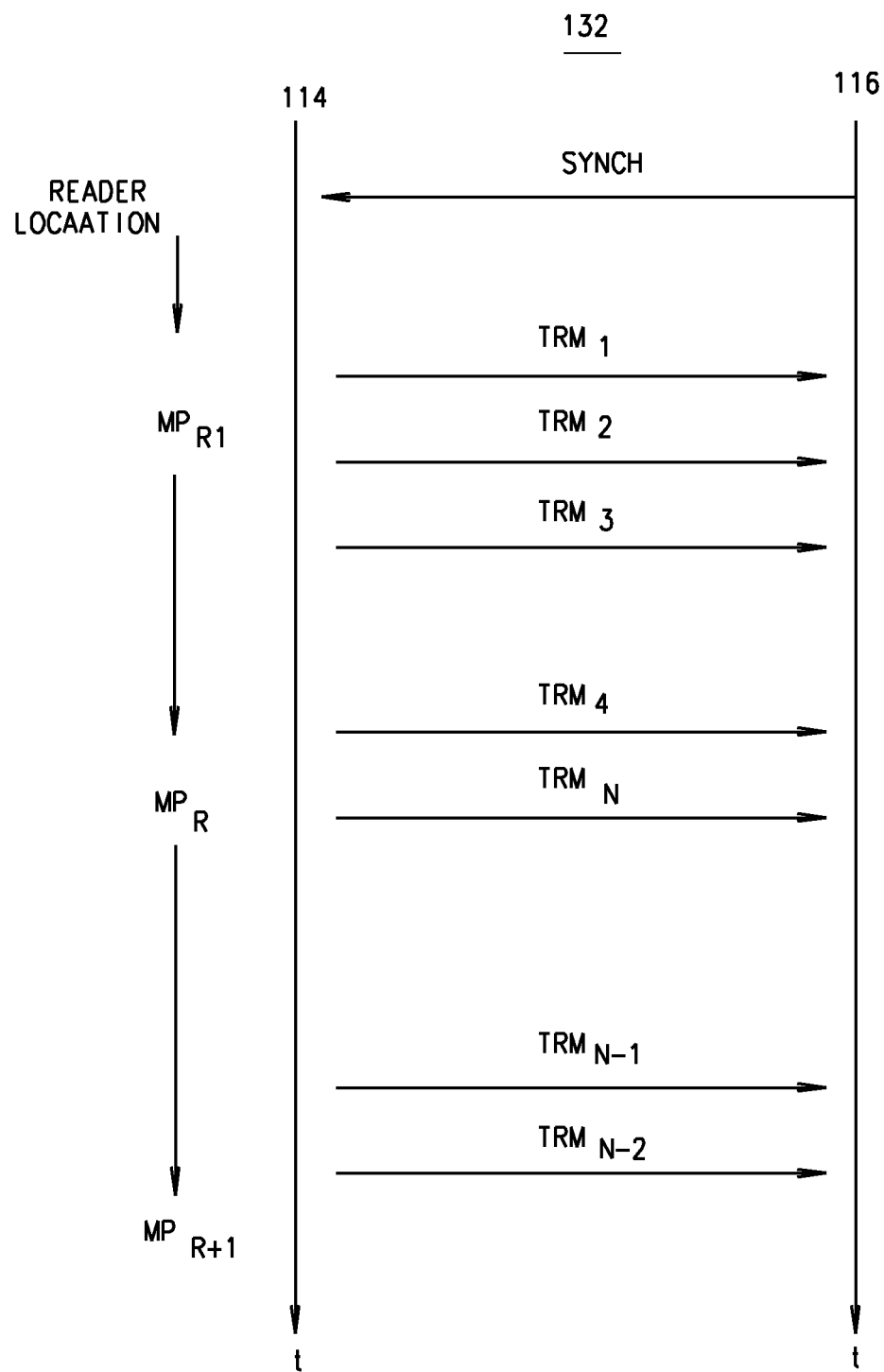
FIG. 7 is a timing diagram of a communication protocol between a TRS system and a timing system showing multiple tag reads according to one exemplary embodiment.

FIG. 7 illustrates another timing diagram 132 that is different than FIG. 6 in that the timing flow is from different tag readers systems with one or more antennas, each of the three tag reader systems TRS being located at spaced apart or offset distances from each other, at least two of which are not coincidental with the reference line R. In this illustration, when the participant is at location of monitored point R-1, a first tag reader system A obtains three tag reads $TR_1$, $TR_2$, and $TR_3$. The tag reader system TRS transmits each of these tag reads to the timing system 116 in created tag read messages $TRM_1$, $TRM_2$, and $TRM_3$. As the tag moves from the first monitored point to the second monitored point at point R or reference line R obtains three more tag reads $TR_4$, and $TR_N$ are obtained by same tag reader system TRS that then created tag read messages $TRM_4$, and $TRM_N$ transmits each of these to the timing system 116. Finally, after the tag has passed the reference line, the tag reader system TRS obtains two more tag reads $TR_{n-1}$, and $TR_{n-2}$ and creates and transmits tag read messages $TRM_{n-1}$, and $TRM_{n-2}$ these to the timing system 116. Of course a different number of tag reads per monitored point MP is possible and the illustration of three tag reads per tag reader system is only illustrative.

TRS and TS Operating Environment

Figure 9:
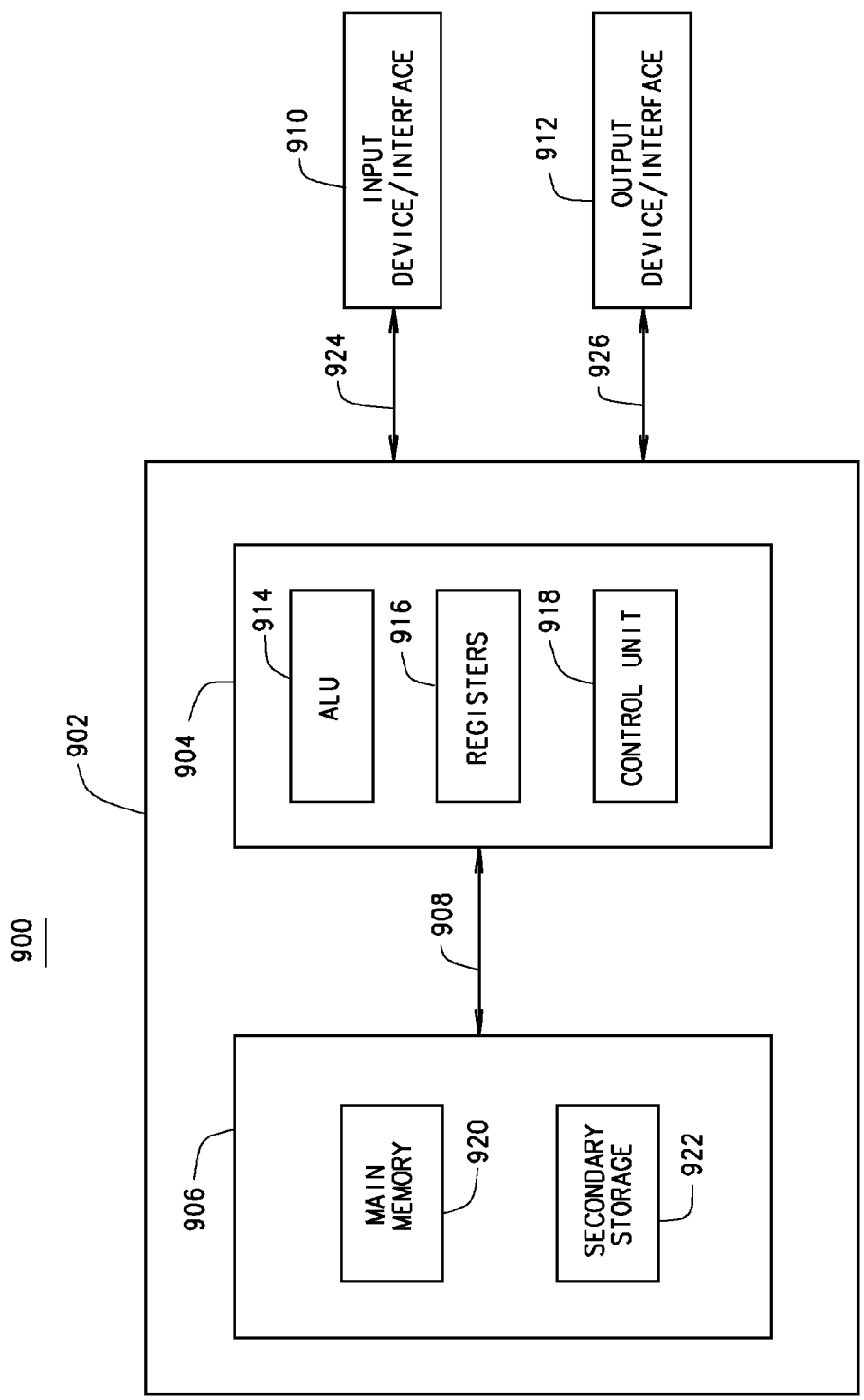
FIG. 9 is a block diagram of a specialized computer system suitable for implementing the tag reader system or timing system according to one exemplary embodiment.

Referring to FIG. 9, an operating environment for an illustrated embodiment of one or more RFID tag reading and timing systems as described herein is a computer system 900 with a computer 902 that comprises at least one high speed central processing unit (CPU) 904, in conjunction with a memory system 906 interconnected with at least one bus structure 908, an input device 910, and an output device 912. These elements are interconnected by at least one bus structure 908. As addressed above, the input and output devices can include a communication interface including an antenna interface. Any or all of the components of the TRS and/or TS systems can be any computing device including, but not limited to, a lap top, PDA, Cell/mobile phone, as well as potentially a dedicated device. The software can be implemented as any "app" thereon and still be within the scope of this disclosure.

The illustrated CPU 904 for an RFID semiconductor chip is of familiar design and includes an arithmetic logic unit (ALU) 914 for performing computations, a collection of registers for temporary storage of data and instructions, and a control unit 916 for controlling operation of the computer system 900. Any of a variety of processors, including at least those from Digital Equipment, Sun, MIPS, Motorola, NEC, Intel, Cyrix, AMD, HP, and Nexgen, is equally preferred but not limited thereto, for the CPU 904. This illustrated embodiment operates on an operating system designed to be portable to any of these processing platforms.

The memory system 906 generally includes high-speed main memory 920 in the form of a medium such as random access memory (RAM) and read only memory (ROM) semiconductor devices that are typical on an RFID semiconductor chip. However, the present disclosure is not limited thereto and can also include secondary storage 922 in the form of long term storage mediums such as floppy disks, hard disks, tape, CD-ROM, flash memory, etc., and other devices that store data using electrical, magnetic, and optical or other recording media. The main memory 920 also can include, in some embodiments, a video display memory for displaying images through a display device (not shown). Those skilled in the art will recognize that the memory system 906 can comprise a variety of alternative components having a variety of storage capacities.

Where applicable, while not typically provided on RFID tags or chips, an input device 910, and output device 912 can also be provided. The input device 910 can comprise any keyboard, mouse, physical transducer (e.g. a microphone), and can be interconnected to the computer 902 via an input interface 924 associated with the above described communication interface including the antenna interface for wireless communications. The output device 912 can include a display, a printer, a transducer (e.g. a speaker), etc, and be interconnected to the computer 902 via an output interface 926 that can include the above described communication interface including the antenna interface. Some devices, such as a network adapter or a modem, can be used as input and/or output devices.

As is familiar to those skilled in the art, the computer system 900 further includes an operating system and at least one application program. The operating system is the set of software or computer executable instructions that control the various computerized systems or components and their operation and allocation of resources. The application program is the set of software that performs a task desired by the user, using computer resources made available through the operating system. Both are typically resident in the illustrated memory system 906 that may be resident on the RFID semiconductor chip. These can include the tag reader system with computer implementable instructions stored in its memory that are accessible by and executable by the processor for performing one or more of the tag reader methods and means as described herein. Also, this can include the timing system with computer implementable instructions stored in its memory that are accessible by and executable by its processor for performing one or more of the timing system methods and means as described herein.

In accordance with the practices of persons skilled in the art of computer programming, the present disclosure is described below with reference to symbolic representations of operations that are performed by the computer system 900. Such operations are sometimes referred to as being computer-executed. It will be appreciated that the operations that are symbolically represented include the manipulation by the CPU 904 of electrical signals representing data bits and the maintenance of data bits at memory locations in the memory system 906, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above in connection with the memory system 906.

Generally, the detection line located along a route traveled by the RFID tags is a starting line, a finish line or an intermediary check point line. As such, while the current disclosure is not limited to timing or tracking of timed racing events, in the exemplary embodiment as described herein, the timing system is configured for receiving each of the RFID tag read messages and determining a lapsed time of the RFID tag traversing between at least two of the starting line, the intermediary check point line and the finish line, responsive to at least one of the received RFID tag read messages.

As one skilled in the art will understand after reviewing the present disclosure, while the primary exemplary embodiment as described herein has been related to timing passings or elapsed time of a tag used in a racing event, other applications of timing activities using RFID tags is also possible and considered within the scope of the present disclosure. The following is a brief description of some additional applications and/or embodiments.

a. in medical facilities such as hospitals for tracking the flow of patients into and out of their emergency rooms. This can include tracking patient flow through their facilities so they know the speed of entry, time of wait, time for certain treatments, location of the patients in their ER centers, etc.

b. in prisons and schools for tracking and timing individual movements therein.

c. at trade-shows to track the traffic flow of people attending a show, including tracking the paths that attendees take through the exhibition center floor and how much time they spend at various booths.

d. sporting events for tracking players on the playing field or surface, time on the field or playing surface versus the bench or a penalty box. Such real-time tracking data can be fed to coaches, television and radio broadcasters, and officials.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A timing system for determining a time of detection of a plurality of RFID tags relative to a detection line located along a route traveled by the RFID tags, the system comprising:

a tag reader system having housing with a cavity containing a processor, a memory, a clock, a communication interface, a radio frequency transceiver for wirelessly communicating with a plurality of the RFID tags, computer executable instructions and an antenna coupled to the radio frequency transceiver for transmitting and receiving wireless messages between the radio frequency transceiver and each communicating RFID tags, the housing including a fixture for mounting the housing in proximity to the detection line, the tag reader system configured by the computer executable instructions for transmitting a plurality of tag read requests and receiving a plurality of tag reads from each communicating RFID tag when each is located in proximity to the detection line, time stamping at least two of each of the RFID tag reads for each RFID tag including a first tag read and a subsequent tag read and creating a RFID tag read message for each RFID tag read wherein each RFID tag read message includes the first and subsequent tag reads for a single one of the RFID tags with their associated time stamps, and transmitting over the communication interface each RFID tag read message; and a timing system having a memory and processor and a communication interface communicatively coupled to the communication interface of the tag reader system for receiving the transmitted RFID tag read messages, the timing system determining a lapsed time for each of the RFID tags traversing the route traveled responsive to the received RFID tag read message and at least one of the included tag reads and associated time stamps.

2. The system of claim 1 wherein the tag reader system determines a time for each of the received tag reads responsive to the received RFID tag read messages and determines an average time based on the determined times for a plurality of the received RFID tag reads and determines an average tag read time and wherein the determined average tag read time is included in the created RFID tag read message, wherein the RFID tag read message consists of the first and a last occurring subsequent tag read and the determined average tag read time.

3. The system of claim 1 wherein the RFID tag is a passive RFID tag and wherein the radio frequency transceiver transmits a powering activation message and the read request message to RFID tag located in proximity to the detection line.

4. The system of claim 1 wherein the tag read requests are continuously transmitted as pulsed messages.

5. The system of claim 4 wherein the tag reader system transmits tag read requests at a predetermined selectable rate.

6. The system of claim 1 wherein each of the tag reads includes a tag serial number of the RFID tag.

7. The system of claim 6 wherein each tag read message includes a data packet having a tag reader system identifier, a tag read time, and the tag serial number.

8. The system of claim 1 wherein the timing system determines a time of passing of the RFID tag at the detection line responsive to the received tag read times.

9. The system of claim 1 wherein each tag read message includes a data packet having a tag reader system identifier and the tag serial number.

10. The system of claim 1 wherein the included subsequent tag read is within a predetermined time period of an immediately prior subsequent tag read.

11. The system of claim 10 wherein the tag reader system disregards at least one of the subsequent tag reads for each RFID tag when such subsequent tag read has a time stamp of greater than a predetermined time period following the immediately prior subsequent tag read.

12. The system of claim 1 wherein the tag reader system receives a plurality of subsequent tag reads for each communicating RFID tag and time stamps and stores each tag read in the tag reader memory, and wherein the each RFID tag read message includes each tag read and associated time stamp for a single RFID tag.

13. The system of claim 1 wherein the tag reader system receives a plurality of subsequent tag reads for each communicating RFID tag and time stamps each tag read and wherein the first tag read and the last occurring subsequent tag read, but not the other subsequent tag reads, is included in the created RFID tag read message.

14. The system of claim 1 wherein the tag reader system receives a plurality of subsequent tag reads for each communicating RFID tag, the tag reader system having a tag read counter for incrementing a tag read count parameter for each received tag read of each communicating RFID tag, and wherein the created RFID tag read message includes the tag read count parameter.

15. The system of claim 1 wherein each RFID tag read message for each communicating RFID tag is stored in the tag reader system memory and wherein the tag reader system only transmits the created RFID tag read messages responsive to a prompt received from the timing system.

16. The system of claim 1 wherein the radio frequency transceiver and the antenna are configured to transmit and receive in a frequency band from about 900 MHz to about 930 MHz.

17. The system of claim 1 wherein the housing and the antenna of the tag reader system are configured to have a combined effective antenna gain of about 6 dBi.

18. The system of claim 1 wherein the radio frequency transceiver and the antenna are configured to transmit and receive in a frequency band from about 900 MHz to about 930 MHz and wherein the housing has a bottom wall, four side walls and a lid wall and wherein the bottom wall has dimensions of about 10 inches by about 14.7 inches and the lid wall has dimensions of about 10.9 inches by about 19.6 inches and wherein an offset distance between the bottom wall and the lid wall is about 3 inches.

19. The system of claim 18 wherein the housing is configured from ABS plastic material having an integrated UV protective material.

20. The system of claim 18 wherein the housing has a bottom wall, four side walls and a lid wall, each wall having a thickness of about 0.129 inch.

21. The system of claim 18 wherein the antenna of the tag reader system lies in a plane positioned within the cavity that is offset and parallel to a plane of the lid wall, and wherein the offset is about 0.79 inches.

22. The system of claim 1 wherein the housing has a bottom wall, four side walls and a lid wall, and wherein the bottom wall and lid wall are in parallel planes, the lid wall having an area that is greater than the area of the bottom wall and wherein each of the four side walls are sloped outwardly from a coupling of each with the bottom wall to a coupling of each with the lid wall.

23. The system of claim 1 wherein the housing has a bottom wall, four side walls and a lid wall and wherein the mounting fixture is integrated within an exterior surface of the bottom wall of the housing.

24. The system of claim 23 wherein the antenna is a substantially directional antenna having greater gain in the direction perpendicular with a plane including the lid wall and outwardly from the lid wall.

25. The system of claim 1, further comprising a horizontal mounting frame for mounting the tag reader system, the housing being configured to be mounted to the horizontal mounting frame via the mounting fixture in a position about 7 feet above a plane of the surface of the ground upon which the defines the route traveled by the RFID reader.

26. The system of claim 1 wherein the tag reader system further periodically transmits wake up/powering messages for activating the RFID tags that are within the proximity of the tag reader system and wherein each of the communicating RFID tags is responsive to at least one of the transmitted wake up/powering messages, and wherein the tag reader system receives an acknowledgement message from each communicating RFID tag responsive to the at least one transmitted wake up/powering message, and wherein the transmitting of a read request by the tag reader system to one particular communicating RFID tag is responsive to the received acknowledgement message from that particular one communicating RFID tag.

27. The system of claim 26 wherein the tag reader system transmits a sleep instruction including a sleep time to at least one of the communicating RFID tags responsive to receiving a tag read responsive to a read request.

28. The system of claim 1 wherein the tag reader system includes an external antenna interface for interfacing with an external antenna positioned at a distance from the housing, the external antenna interface being communicatively coupled to the radio frequency transceiver for wirelessly communicating with the RFID tag via the external antenna separately and independently from the antenna positioned within the housing.

29. The system of claim 28 wherein the tag reader system creates the RFID tag read message to include an identification of at least one of the antenna and the external antenna from which one of the included tag reads was received.

30. The system of claim 1 wherein the tag reader system transmits the crated tag read messages to the timing system at a user selectable interval.

31. The system of claim 30 wherein the tag reader system is configurable by a user for transmitting the created tag read messages at an interval between about 1 second to about 9 seconds.

32. The system of claim 1 wherein the timing system is configured with instructions for the tag reader system including power level settings of the radio frequency transceiver and settings for the antenna, and wherein the timing system is configured to transmit the power level settings of the tag reader system radio frequency transceiver and the antenna settings to the tag reader system and wherein the tag reader system is configured to receive the power level settings and antenna settings and to set such settings within the tag reader system responsive thereto.

33. The system of claim 1 wherein the tag reader system is configured to receive tag reader programming instructions from the timing system and to implement such received tag reader programming instructions as received, the tag reader programming instructions including, a rate of predetermined number of RFID tag reads per detected RFID tag within a proximity with the tag reader system.

34. The system of claim 1 wherein the timing system includes a tag reader remote configuration module including instructions for remotely configuring the tag reader system and wherein the communication interface of the timing system and the communication interface of the tag reader system are communicatively coupled for communicating the remote configuration instructions from the timing system to the tag reader system, and wherein the tag reader system configures one or more operating parameters of at least one of the processor, the radio frequency transceiver and the antenna responsive to received remote configuration instructions.

35. The system of claim 34 wherein the remote configuration instruction is selected from the list consisting of antenna power, transceiver power level, and RFID tag read request scan rate.

36. The system of claim 34 wherein the tag reader system periodically transmits a plurality of monitored parameters over its communication interface to the communication interface of the timing system, and wherein the tag reader remote configuration module of the timing system receives the monitored parameters, analyzes the monitored parameters including comparing of at least one monitored parameter with a predefined parameter value, and determines a remote configuration instruction responsive to the analyzing and comparing, wherein the determined remote configuration instruction is included in the communicating from the timing system to the tag reader system and wherein the tag reader configures at least one of the one or more operating parameter responsive to the determined remote configuration instruction.

37. The system of claim 36 wherein the operating parameter is selected from the list consisting of setting of an antenna power level, a setting of a transceiver power level, and a setting a RFID tag read request scan rate, tag read request failure rate and RFID tag read inventory count.

38. The system of claim 34 wherein the tag reader remote configuration module includes a statistical analysis module that track the received RFID tag read messages and the included tag reads and time stamps, and statistically analyzes them, and wherein tag reader remote configuration module determines at least one of the instructions responsive to the statistical analysis of the received RFID tag read messages.

39. The system of claim 1 wherein the detection line located along a route traveled by the RFID tags is a starting line, a finish line or an intermediary check point line, and wherein the timing system is configured for receiving each of the RFID tag read messages and determining a lapsed time of each of the RFID tags traversing between at least two of the starting line, the intermediary check point line and the finish line, responsive to at least one of the received RFID tag read messages.

40. The system of claim 1, further comprising a local power supply for supplying local power to the tag reader system contained within the housing.

41. The system of claim 40 wherein the local power supply is selected from the group consisting of a battery, a received energy source received over the communication interface, a received energy source received over a remote power interface, a fuel cell, and a solar power generator.

42. A tag reader system for determining a time of detection of a RFID tag relative to a detection line located along a route traveled by the RFID tag, the system comprising:
a processor,
a memory coupled to the processor for storing computer executable instructions, operating parameters, tag reads and created RFID tag read messages;
a clock coupled to the processor and including an interface for receiving an input signal for setting a current time of the clock;
a housing having a cavity for enclosing the processor, the memory, and the clock, the housing includes a mounting fixture for mounting the tag reader system in a fixed position in proximity to the detection line for reading the RFID tags located in a range of between about 1 and about 20 feet;
a communication interface coupled to the processor for communicating with a remote timing system including the transmitting of created RFID tag read messages as stored in the memory and receiving RFID tag read message requests from the timing system and remote tag reader instructions;
a wireless transceiver coupled to the processor for wirelessly communicating with the RFID tag;
an antenna coupled to the wireless transceiver for transmitting and receiving wireless messages between the wireless transceiver and the RFID tag, wherein the wireless transceiver and the antenna are also contained in the cavity of the housing, and the combination of the antenna and the housing have an effective gain of about 6 dBi, the antenna transmitting a plurality of tag read messages as received from the wireless transceiver and receiving tag reads from a plurality of the RFID tags located in proximity to the detection line to which the housing is positioned.

43. A method for determining a time of detection of a RFID tag relative to a detection line located along a route traveled by the RFID tag, the method comprising:
at a tag reader system having a housing with a cavity, a processor, a memory, a plurality of computer implementable instructions stored in the memory and executable by the processor, a clock, a communication interface, a radio frequency transceiver coupled to the processor for wirelessly communicating with the RFID tag, and an antenna coupled to the radio frequency transceiver, the processor, the memory, the clock, the radio frequency transceiver, and the antenna being positioned within the cavity of the housing, the housing including a fixture for positioning the tag reader system in a fixed position in proximity to the detection line;
receiving instructions over the communication interface from a remote timing system including at least one parameter for operation of at least one of the radio frequency transceiver, antenna, and the computer implementable instructions;
updating an operating parameter of the tag reader system responsive to the received instructions including the at least one parameter;
transmitting via the radio frequency transceiver and the antenna a wake up/powering message, said transmitting being on a periodic basis defined by an operating transmission interval parameter as received from the processor;
receiving a plurality of acknowledgement messages from a plurality of communicating the RFID tags that are in the proximity of the tag reader system, each acknowledgement message including an RFID tag identifier for uniquely identifying a particular one of the proximal RFID tags from among the plurality of communicating proximal RFID tags;

transmitting a first read request to a first particular one of the communicating RFID tags utilizing the RFID tag identifier for that tag as received in the acknowledgement message for that particular one RFID tag;

receiving a first tag read from the particular one communicating RFID tag following the transmitting of the first read request;

time stamping the first tag read based on a first time of receipt of the first tag read as determined by the clock;

storing the time stamped first tag read in the memory for the particular one RFID tag;

transmitting a second read request to the particular one communicating RFID tag utilizing the same unique tag identifier for that RFID tag;

receiving a second tag read from the particular one communicating RFID tag following the transmitting of the second read request;

time stamping the second tag read based on a second time of receipt of the second tag read as determined by the clock;

storing the time stamped second tag read in the memory for the particular one RFID tag;

determining an average time value for the first and second tag reads for the particular one communicating RFID tag and storing the average time in the memory for the particular one RFID tag;

determining a number of tag read instances of first and second tag reads associated with the particular one communicating RFID tag and storing the number of tag read instances in the memory for the particular one RFID tag;

receiving a request from the remote timing system over the communication interface for communicating RFID tag read messages from RFID tag reads as received by the tag reader system;

creating a RFID tag read message including the RFID tag identifier and the time stamped first tag read and the average time value; and transmitting the created RFID tag read message over the communication interface.

* * * * *